(12) United States Patent
Xin et al.

(10) Patent No.: US 12,225,584 B2
(45) Date of Patent: Feb. 11, 2025

(54) RESTRICTED TARGET WAIT TIME (R-TWT) OPERATIONS AND PARAMETERS

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 372 days.

(21) Appl. No.: 17/679,798

(22) Filed: Feb. 24, 2022

(65) Prior Publication Data

US 2022/0386372 A1 Dec. 1, 2022

Related U.S. Application Data

(60) Provisional application No. 63/211,683, filed on Jun. 17, 2021, provisional application No. 63/192,656, filed on May 25, 2021.

(51) Int. Cl.
*H04W 74/08* (2024.01)
*H04L 5/00* (2006.01)
(Continued)

(52) U.S. Cl.
CPC ....... *H04W 74/0816* (2013.01); *H04L 5/0073* (2013.01); *H04L 5/0098* (2013.01); *H04W 48/16* (2013.01); *H04W 72/53* (2023.01)

(58) Field of Classification Search
CPC . H04L 5/0073; H04L 27/0006; H04L 5/0098; H04W 52/0209; H04W 48/16;
(Continued)

(56) References Cited

U.S. PATENT DOCUMENTS

2022/0345187 A1* 10/2022 Merlin ................. H04W 80/02
2023/0262768 A1* 8/2023 Ko ......................... H04W 76/15
(Continued)

FOREIGN PATENT DOCUMENTS

| EP | 3629622 A1 | 4/2020 |
|---|---|---|
| JP | 2017525196 A | 8/2017 |
| WO | WO-2022075821 A1 | 4/2022 |

OTHER PUBLICATIONS

Hu, Chunyu et al., "Protected TWT Enhancement for Latency Sensitive Traffic", IEEE 802.11-20/1046r3, Jul. 29, 2020, 17 slides.
(Continued)

*Primary Examiner* — Brian D Nguyen
(74) *Attorney, Agent, or Firm* — O'BANION & RITCHEY LLP; John P. O'Banion

(57) ABSTRACT

A wireless protocol performing Restricted Target Wait Time (R-TWT) signaling and its parameters to reduce latency, such as for real-time application traffic. Further control of traffic flow is provided during the R-TWT Service Period (SP), including whether: R-TWT SP can be extended, multiple overlapped R-TWT SPs on different links can be started, spatial reuse is required during R-TWT SP, allowance of transmission outside R-TWT SP, or use of Quiet element to protect R-TWT SP, whereby R-TWT operation (mode) is described with enhanced operations. Protocol is applicable to Wireless Local Area Networks (WLANs), and is especially well suited for 802.11be 802.11ax, Real-Time Application (RTA) traffic such as on time sensitive networks, Wi-Fi and on Multi-Link Devices (MLDs).

20 Claims, 17 Drawing Sheets

(51) Int. Cl.
*H04W 48/16* (2009.01)
*H04W 72/04* (2023.01)
*H04W 72/53* (2023.01)
*H04W 74/0816* (2024.01)

(58) Field of Classification Search
CPC ... H04W 74/002; H04W 72/53; H04W 48/10; H04W 52/0216; H04W 74/0816; H04W 84/12; Y02D 30/70
See application file for complete search history.

(56) References Cited

U.S. PATENT DOCUMENTS

| | | | | |
|---|---|---|---|---|
| 2023/0354426 | A1* | 11/2023 | Lu | H04W 74/04 |
| 2023/0389078 | A1* | 11/2023 | Baron | H04W 74/0816 |
| 2024/0032089 | A1* | 1/2024 | Chitrakar | H04W 48/02 |
| 2024/0114455 | A1* | 4/2024 | Baek | H04W 56/0015 |

OTHER PUBLICATIONS

Hu, Chunyu et al., "Restricted TWT Spec Text Resolving TBDs: Part I", IEEE 802.11-21/462, Apr. 23, 2021, 8 pages.
"IEEE Standard for Information Technology—Telecommunications and Information Exchange between Systems Local and Metropolitan Area Networks-Specific Requirements, Part 11: Wireless LAN Medium Access Control (MAC) and Physical Layer (PHY) Specifications Amendment 1: Enhancements for High-Efficiency Wl", IEEE Standard, IEEE, Piscataway, NJ USA, May 19, 2021 (May 19, 2021), pp. 1-767, XP068181575, DOI: 10.1109/IEEESTD.2021. 9442429 ISBN: 978-1-5044-7389-7.
Chunyu Hu (Facebook Inc): "PDT-MAC-Restricted-TWT", IEEE Draft; 11-21-0142-09-00BE-PDT-MAC-RESTRICTED-TWT, IEEE-SA Mentor, Piscataway, NJ USA, vol. 802.11 EHT; 802.llbe, No. 9 ,Mar. 4, 2021 (Mar. 4, 2021), pp. 1-4, XP068179460.
Chunyu Hu, et al (Facebook Inc): "Prioritized EDCA channel access—slot management", IEEE Draft; 11-20-1046-04-00BE-PRIORITIZED-EDCA-CHANNEL-ACCESS-SLOT-MANAGEMENT, IEEE-SA Mentor, Piscataway, NJ USA, vol. 802.11 EHT; 802.llbe, No. 4, Sep. 8, 2020 (Sep. 8, 2020), pp. 1-17, XP068172529.
Dibakar Das, et al (Intel): "CR for CID 1977", IEEE Draft; 11-21-0340-05-00BE-CR-FOR-CID-1977, IEEE-SA Mentor, Piscataway, NJ USA, vol. 802.11 EHT; 802.llbe, No. 5, May 10, 2021 (May 10, 2021), pp. 1-8, XP068180120.
Liangxiao Xin, et al (Sony): "Interaction between R-TWT and SCS (CC36 resolution for CID 4121)", IEEE Draft; 11-22-0212-02-00BE-INTERACTION-BETWEEN-R-T WT-AND-SCS-CC36-RESOLUTION-FOR-CID-4121, IEEE-SA Mentor, Piscataway, NJ USA, vol. 802.11 EHT, 802.llbe, No. 2, Feb. 23, 2022 (Feb. 23, 2022), pp. 1-12, XP068189089.
Sunhee Baek, et al: "CR for Restricted TWT SP", IEEE Draft; 11-21-0672-00-00BE-CR-FOR-RESTRICTED-TWT-S P, IEEE-SA Mentor, Piscataway, NJ USA, vol. 802.11 EHT; 802.llbe, Apr. 15, 2021 (Apr. 15, 2021), pp. 1-3, XP068179753.
Chunyu Hu (Facebook Inc.), et al, "Proposed Spec Text Restricted TWT", IEEE 802.11-21/142r8, IEEE P802.11 Wireless LANs, Jan. 2021, pp. 1-6.
Chunyu Hu (Facebook Inc.), et al, "Protected TWT Enhancement for Latency Sensitive Traffic", IEEE 802.11-20/1046r14, Aug. 2020, pp. 1-24.
Chunyu Hu (Facebook Inc.), et al, "Restricted TWT Spec Text Resolving TBDs: Part I", IEEE 802.11-21/0462r9, IEEE P802.00, Wireless LANs, Mar. 2021, pp. 1-9.
DIBAKAR DAS(Intel), et al., SCS Procedure for EHT, IEEE 802.11-21/0340r1, IEEE P802.11 Wireless LANs, Feb. 2021, pp. 1-9.

* cited by examiner

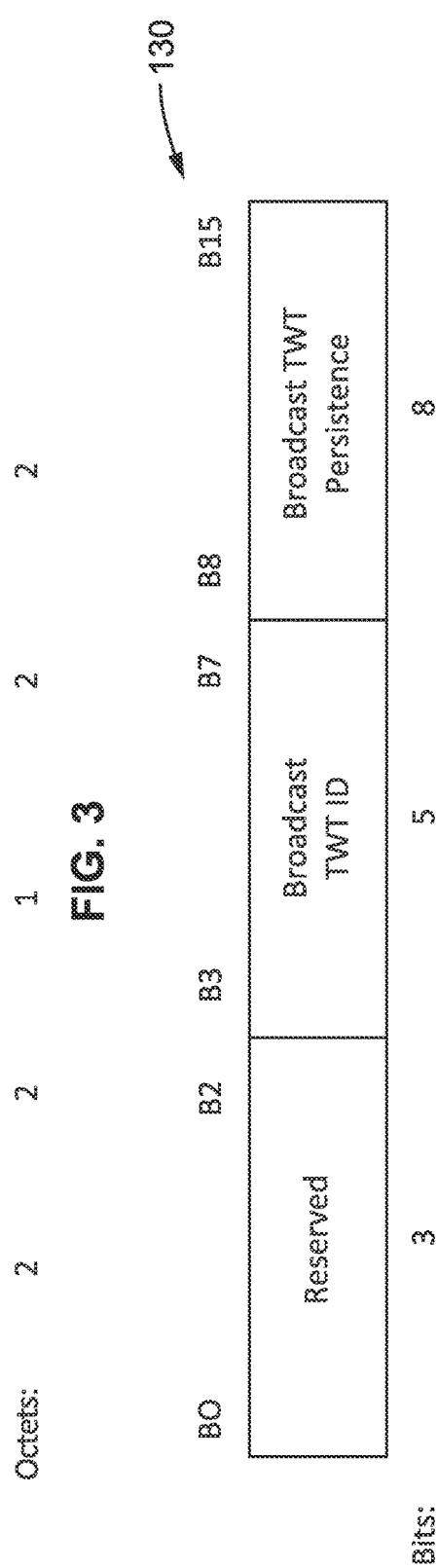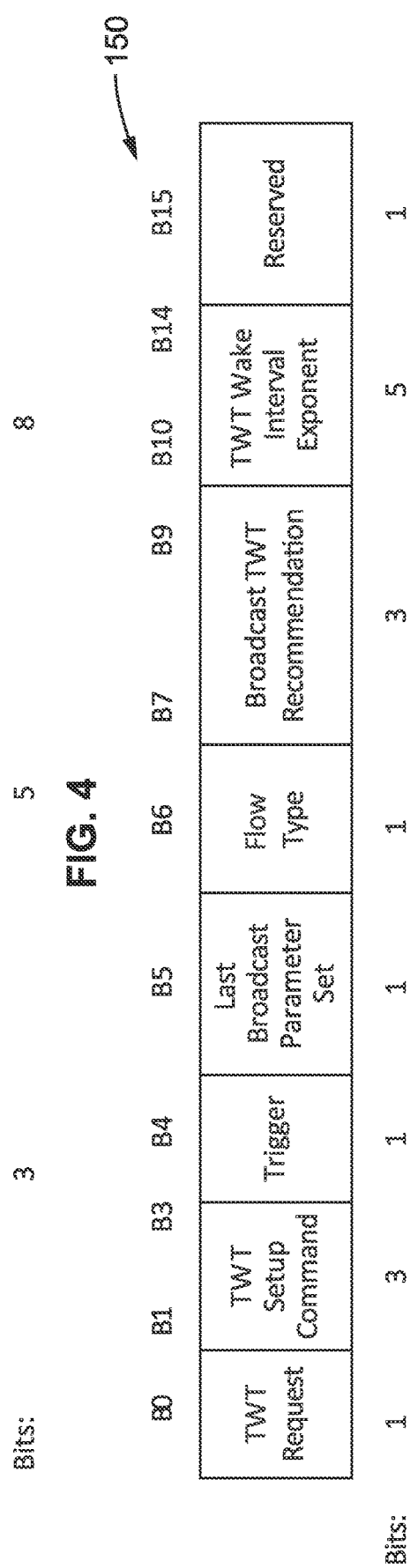

RESTRICTED TARGET WAIT TIME (R-TWT) OPERATIONS AND PARAMETERS

CROSS-REFERENCE TO RELATED APPLICATIONS

This application claims priority to, and the benefit of, U.S. provisional patent application Ser. No. 63/211,683 filed on Jun. 17, 2021, and claims priority to, and the benefit of, U.S. provisional patent application Ser. No. 63/192,656 filed on May 25, 2021, each incorporated herein by reference in their entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to use of Target Wake Time (TWT) on WLAN stations, and more particularly to setting a Reserved TWT mode and its various parameters for enhanced TWT use.

2. Background Discussion

Target Wake Time (TWT) was first introduced with 802.11ah and has progressed through to 802.11ax. The goal of TWT is to enable devices to determine when and how they will wake up to send and receive data. For example, in 802.11ax access points can increase device sleep time toward conserving battery life. This aspect is especially beneficial in roles such as Internet-of-Things (IoT). TWT also provides a mechanism by which wireless access points and similar devices negotiate specific times to access the medium, which aids spectral efficiency.

However, TWT is primarily directed at power savings and does not specifically address real time latency reductions.

Accordingly, a need exists for enhanced handling of TWTs. The present disclosure fulfills that need and provides additional benefits.

BRIEF SUMMARY

A method for performing Restricted Target Wait Time (R-TWT) signaling that is communicated by utilizing bits in the Broadcast TWT parameter set field, that are defined as reserved under IEEE802.11ax, for setting parameters for R-TWT. The R-TWT is particularly beneficial for use with real-time application traffic or other latency sensitive traffic, and in particular traffic from stations that operate in a low power configuration, and which thus awaken for receiving and transmitting data.

Aside from indicating that R-TWT is to be performed, additional parameters are described to specify traffic flow that can be transmitted during R-TWT Service Period (SP), including parameters to indicate whether R-TWT SP can be extended; parameters indicating whether multiple overlapped R-TWT SPs on different links can be started; parameters to indicate whether spatial reuse is required during R-TWT SP; parameters to indicate whether to use Quiet element to protect R-TWT SP. Thus, selection of the R-TWT operation (mode) is described along with enhanced operations and their associated parameters.

In particular, the disclosed technologies describe use of reserved bits in the Broadcast TWT parameter set field to establish R-TWT parameter setting. For example, using reserved bits 5 through 7 of the Broadcast TWT Recommendation subfield and bit 15 (B15) in the Request type field of a broadcast TWT parameter set field for R-TWT parameter setting. In addition, several of these additional parameters are described for enhancing R-TWT signaling.

The present disclosure is applicable to Wireless Local Area Networks (WLANs), and is especially well suited for 802.11be 802.11ax, Real-Time Application (RTA) traffic (or latency sensitive traffic) such as on time sensitive networks, Wi-Fi and on Multi-Link Device (MLDs).

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 3 is a data field diagram of a Broadcast TWT Parameter Set field which is utilized according to at least one embodiment of the present disclosure.

FIG. 4 is a data field diagram of a Broadcast TWT Information subfield which is utilized according to at least one embodiment of the present disclosure.

FIG. 5 is a data field diagram of a Request Type subfield from the broadcast TWT parameter set field as utilized according to at least one embodiment of the present disclosure.

DETAILED DESCRIPTION

1. Introduction

Broadcast TWT (B-TWT) signaling as defined in IEEE 802.11ax can also be adapted to support Restricted TWT (R-TWT) signaling. One specific value (e.g., 4) of the Broadcast TWT Recommendation subfield of the Broadcast TWT Parameter Set field can be utilized to indicate the signaling is for R-TWT as defined in Draft P802.11be D1.31.

B-TWT allows an AP, such as the TWT scheduling AP, to schedule a TWT Service Period (SP) to exchange frames with other stations (STAs) which are TWT scheduled STAs (or the members of the TWT). An individual STA may have membership in broadcast TWT as the result of negotiation with the scheduling AP. A TWT scheduled STA should not transmit frames to the TWT scheduling AP outside of broadcast TWT SPs and should not transmit frames that are not contained within High-Efficiency (HE) Trigger-Based (TB) PPDUs to the TWT scheduling AP within trigger-enabled broadcast TWT SPs, except that the STA can transmit frames within negotiated individual TWT SPs as defined in 26.8.2 (e.g., Individual TWT agreements)" as per Draft P802.11ax_D8.0.

The R-TWT SP can be scheduled and informed in the same manner as B-TWT SP. If the signaling is for R-TWT, then the TWT SP in the signaling is scheduled for R-TWT. Otherwise, the TWT SP in the signaling is scheduled for B-TWT.

The present disclosure provides for enhanced R-TWT signaling as described in the following sections.

2. Embodiments

The enhanced use of R-TWT can be implemented in a variety of 802.11 hardware configurations, the following being provided by way of example and not limitation.

2.1. Station Hardware Configuration

Figure 1:
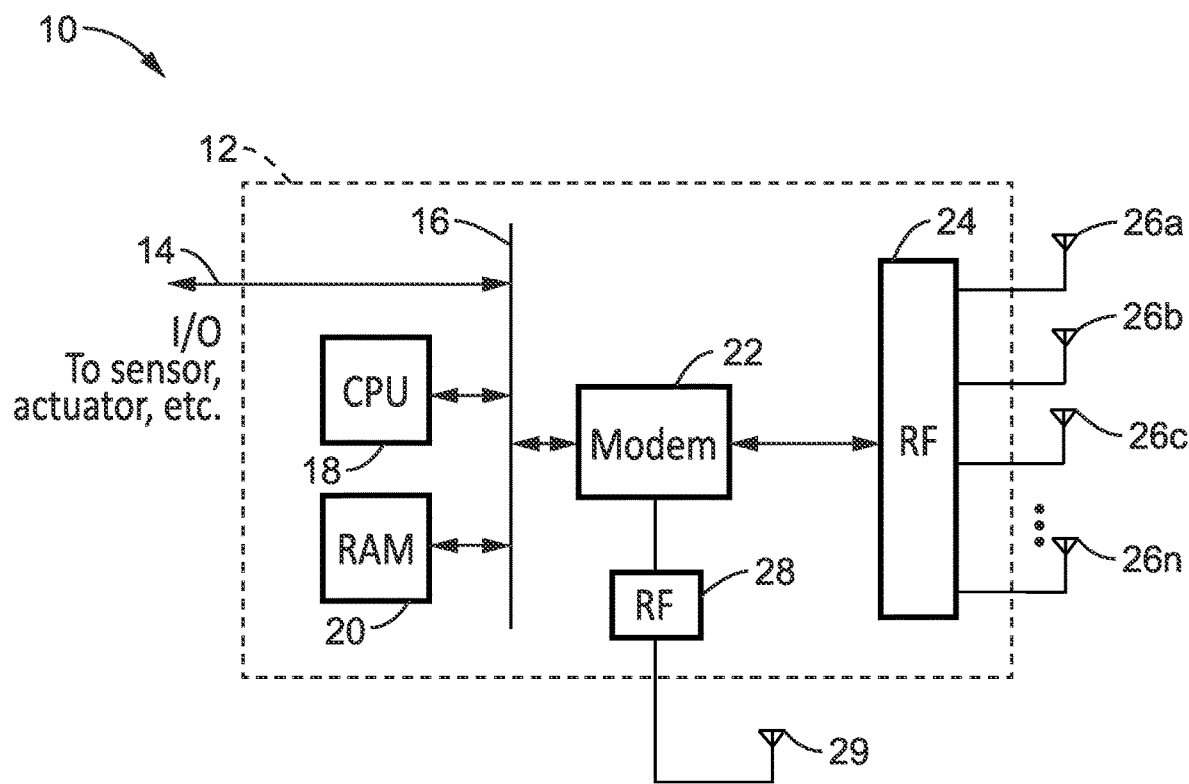
FIG. 1 is a hardware block diagram of wireless station (STA) hardware according to at least one embodiment of the present disclosure.

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 2:
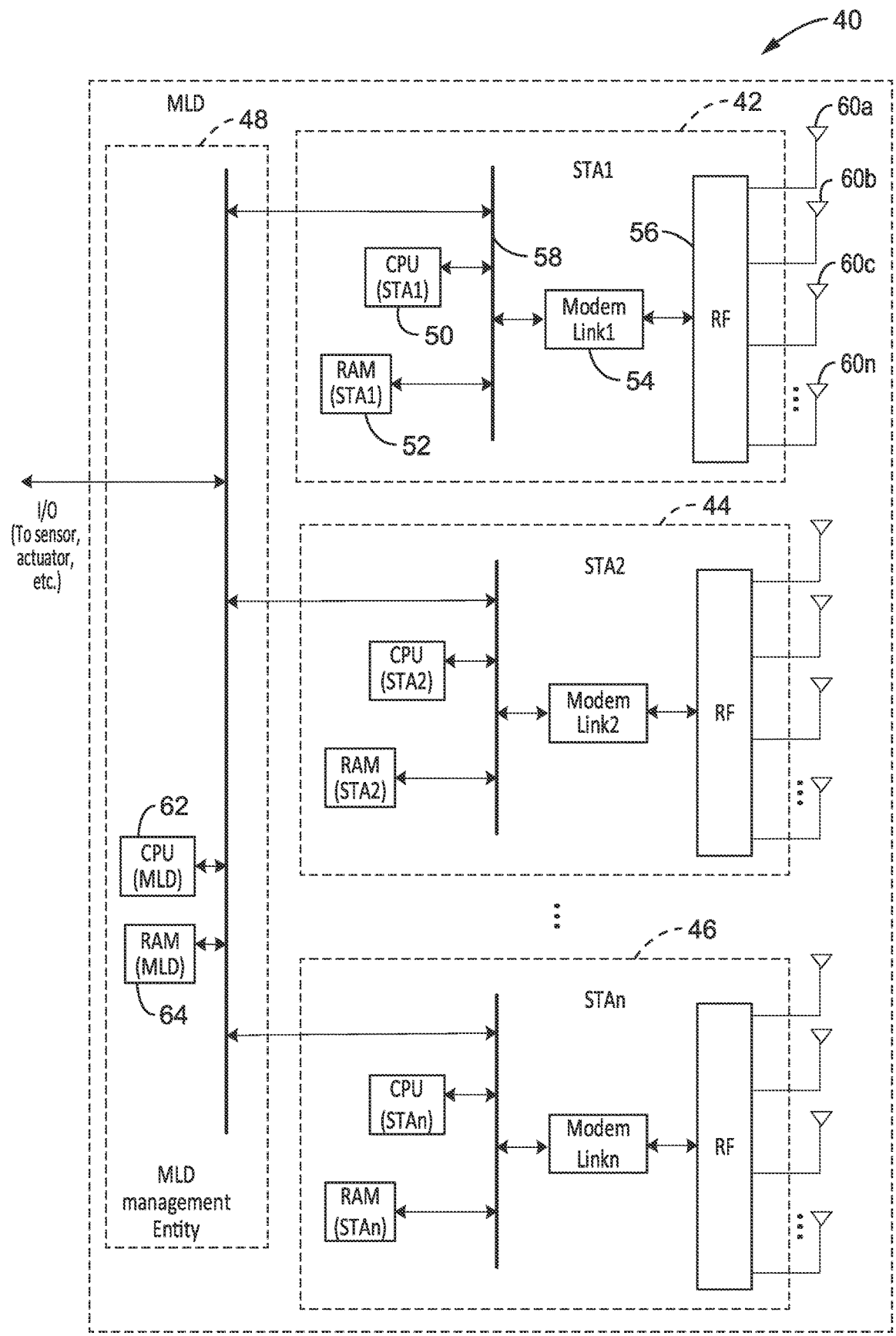
FIG. 2 is a hardware block diagram of a station configuration, such as contained in Multi-Link Device (MLD) hardware, according to at least one embodiment of the present disclosure.

FIG. 2 illustrates an example embodiment 40 of a Multi-Link Device (MLD) hardware configuration. Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

2.2. Data Fields for TWT

FIG. 3 illustrates an example embodiment 110 of a Broadcast TWT Parameter Set field. The fields are shown as Request Type, Target Wake Time, Nominal Minimum TWT Wake Duration, TWT Wake Interval Mantissa and Broadcast TWT Information as described in IEEE 802.11ax (Draft P802.11ax_D8.0).

FIG. 4 illustrates an example embodiment 130 of a Broadcast TWT Information (Info) subfield. The fields are shown as Reserved, Broadcast TWT ID (identification), and Broadcast TWT Persistence.

FIG. 5 illustrates an example embodiment 150 of a Request Type field in a broadcast TWT parameter set field. The fields are shown as TWT Request, TWT Setup Command, Trigger, Last Broadcast Parameter Set, Flow Type, Broadcast TWT Recommendation, TWT Wake Interval Exponent, and a Reserved field.

3. Problem Statement

The Broadcast TWT Recommendation subfield provides an indication for R-TWT. However, to provide enhanced R-TWT operations as disclosed herein, it must be determined what parameter settings should be included in the B-TWT signaling for R-TWT. The following is a list of some candidate parameter settings for R-TWT.

(a) Parameters to specify traffic flow can be transmitted during R-TWT SP. (i) The traffic flow could be identified by SCS ID, Traffic Identifier (TID), Real-Time Application (RTA) ID, or User Priority (UP). It should be noted that RTA ID can be an ID that represents one or more low latency traffic streams. (ii) It is also possible that R-TWT signaling frames carry TSPEC elements to specify that only the traffic under the Traffic Specification (TSPEC) element during the R-TWT signaling can be transmitted during R-TWT SPs. It will be noted that Stream Classification Service (SCS) allows streams to be arbitrarily mapped to the primary and alternate queues.

(b) Parameters to indicate whether the R-TWT SP can be extended. For example, it is possible that a R-TWT SP is not started at its scheduled start time. If a R-TWT SP is started late, the R-TWT SP may be extended after its scheduled end time.

(c) Parameters to indicate whether multiple overlapped R-TWT SPs on different links can be started. Multiple overlapped R-TWT SPs could be scheduled on different links; whereby there are two options. In a first option, only one of those scheduled overlapped R-TWT SPs can be started, and the others are cancelled. In a second option, multiple of those scheduled overlapped R-TWT SPs can be started.

(d) Parameters to indicate whether spatial reuse is required during R-TWT SP. For example, this parameter can require the scheduling AP of the R-TWT to use Parameterized Spatial Reuse Transmission (PSRT) or Parameterized Spatial Reuse Reception (PSRR) Physical Layer Convergence Procedure (PLCP) Protocol Data Unit (PPDU) as defined IEEE 802.11ax for spatial reuse.

(e) Parameters to indicate whether to use Quiet element to protect R-TWT SP. During the R-TWT SP, the scheduling AP can schedule quiet intervals to prevent channel contention from the STAs which are not members of the R-TWT SP. Those STAs can enter quiet mode during the R-TWT SP after receiving a quiet element command from the scheduling AP.

4.0. Objectives of the Present Disclosure

The present R-TWT disclosure has the following objectives.

(a) Using the reserved bits in the Broadcast TWT parameter set field of FIG. 5 to set R-TWT parameter settings. For example, setting a request type field in a broadcast TWT parameter set field. In the Broadcast TWT recommendation subfield: the values of bits 5-7 of this field are reserved, while B15 of the Broadcast TWT Parameter Set field is also reserved.

(b) In the Broadcast TWT Information subfield of FIG. 4, bits B0-B2 are reserved.

(c) Implemented enhanced R-TWT operations.

5.0. Embodiments 5.1. Reserved Bit Options for Representing an R-TWT Set

Figure 6:
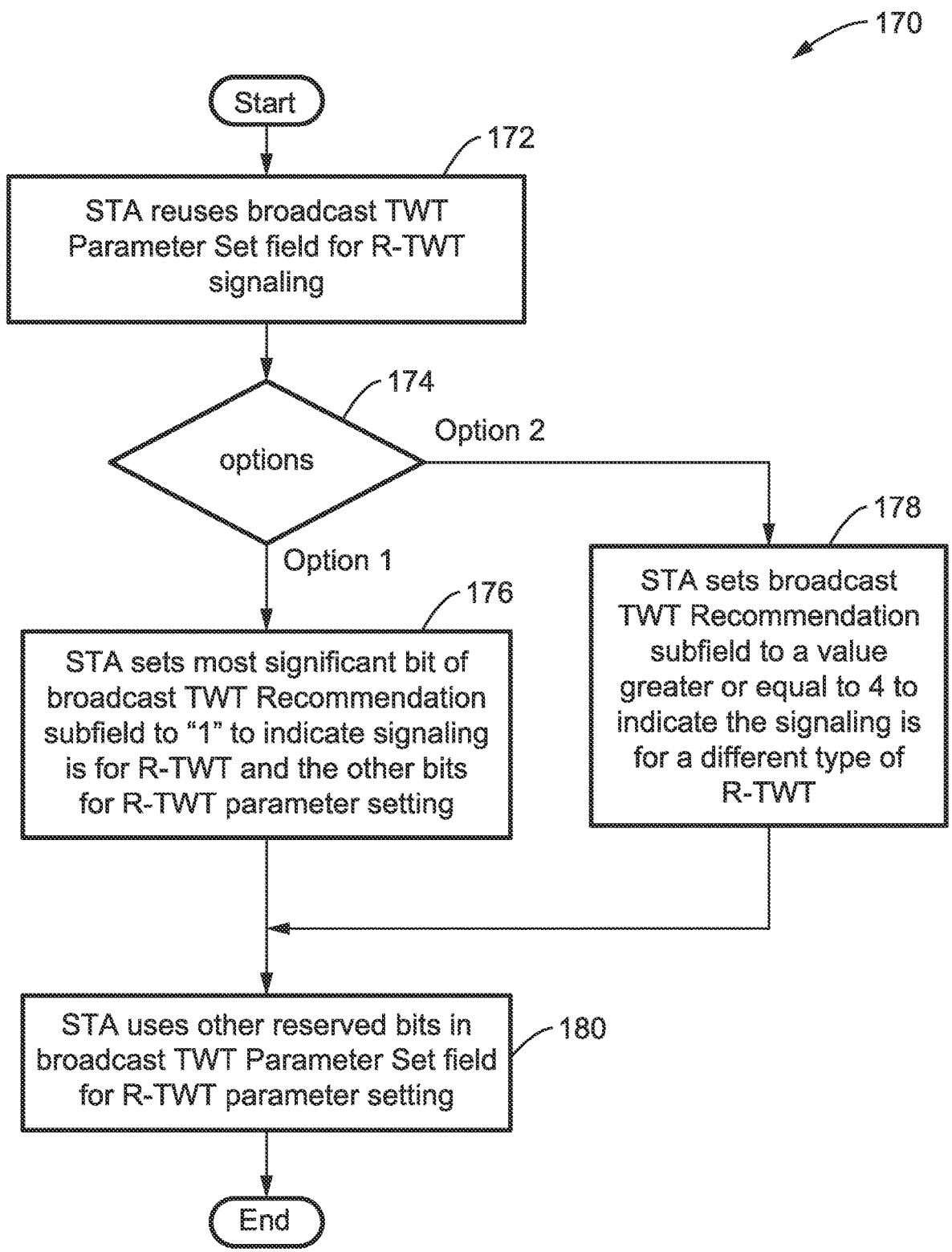
FIG. 6 is a flow diagram of selecting options in which each reserved bit represents an R-TWT setting according to at least one embodiment of the present disclosure.

FIG. 6 illustrates an example embodiment 170 of options in which each reserved bit represents an R-TWT setting. It will be noted that the definition of each reserved bit for R-TWT signaling is predetermined in the protocol. In this flow diagram the protocol should choose either option1 or option2. This flowchart describes a STA can set the parameters in the broadcast TWT Parameter Set field for R-TWT signaling. The STA may be a TWT scheduling AP or an individual STA.

In particular, the flow diagram depicts the STA reusing 172 the Broadcast TWT Parameter Set field for R-TWT signaling, and the selection 174 of either Option 1 or Option 2. For Option 1, the STA sets 176 the most significant bit of the Broadcast TWT Recommendation subfield to a first state (e.g., "1") to indicate that the signaling is for R-TWT, as well as the other bits for R-TWT parameter setting. Then at block 180 the STA uses other reserved bits in the Broadcast TWT Parameters set field for R-TWT parameter setting.

Otherwise, if at block 174 it is determined to use Option 2, then the STA sets 178 the Broadcast TWT Recommendation subfield to a value greater than or equal to 4, to indicate the signaling is for a different type of R-TWT, after which execution reaches block 180 as previously described.

Figure 7:
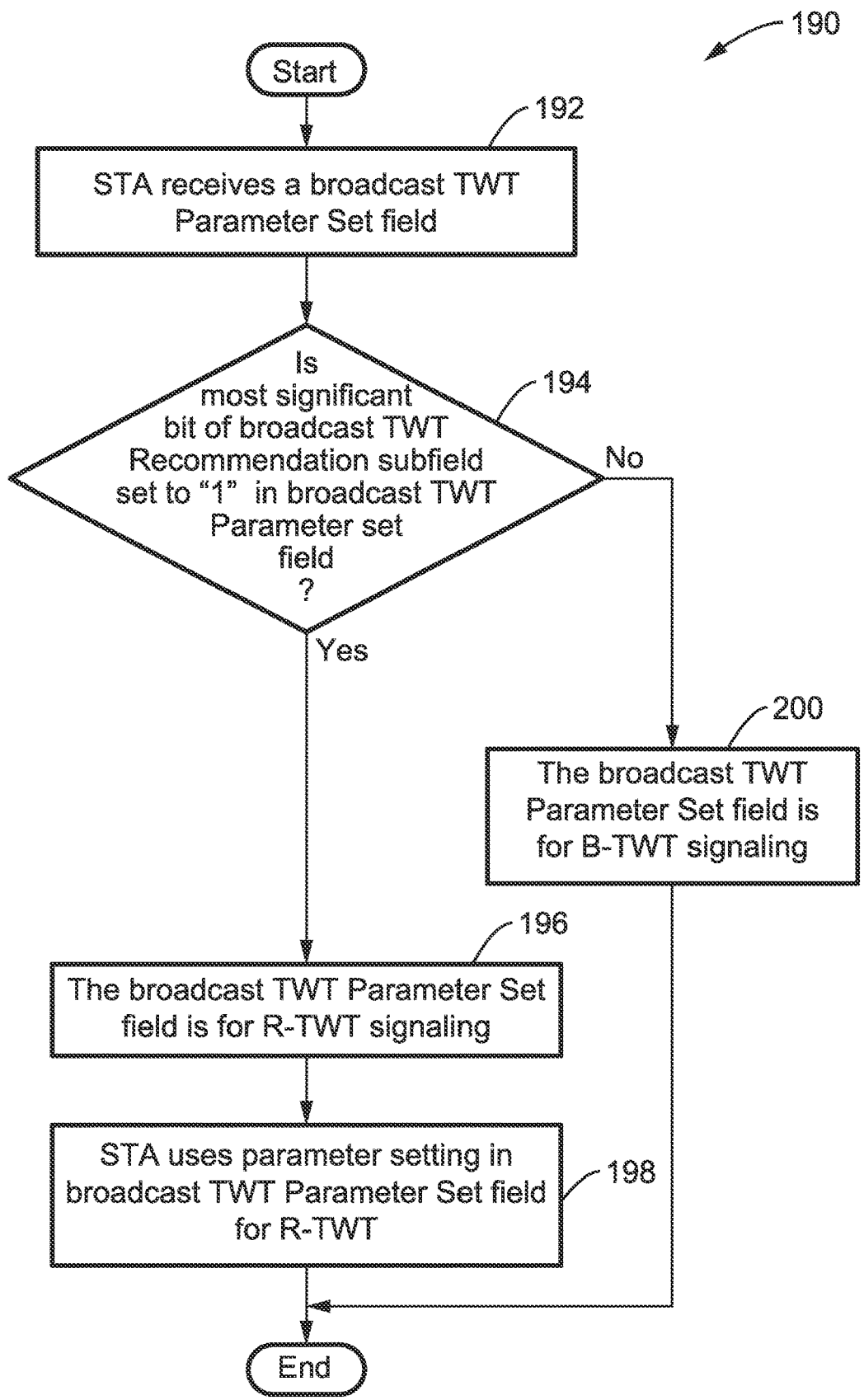
FIG. 7 is a flow diagram of identifying if the received Broadcast TWT Parameter Set field indicates use of a first R-TWT signaling option according to at least one embodiment of the present disclosure.

FIG. 7 illustrates an example embodiment 190 describing a STA identifying whether the received Broadcast TWT Parameter Set field indicates R-TWT signaling when Option1 from FIG. 6 is used. It should be appreciated that the STA could be a TWT scheduling AP or an individual STA.

In particular the flow diagram depicts the STA receiving 192 a Broadcast TWT Parameter Set field, after which a check 194 is made to determine if the most significant bit of the Broadcast TWT Recommendation subfield is set to the first state (e.g., "1").

If the bit is not set to the first state, then block 200 is reached for a Broadcast TWT Parameter set field in B-TWT signaling.

Otherwise, if the bit is in the first state, then execution moves from check 194 to block 196, which recognizes that the Broadcast TWT Parameter set field is set for R-TWT signaling, after which the STA uses 198 the parameters settings found in Broadcast TWT Parameter set field for R-TWT.

Figure 8:
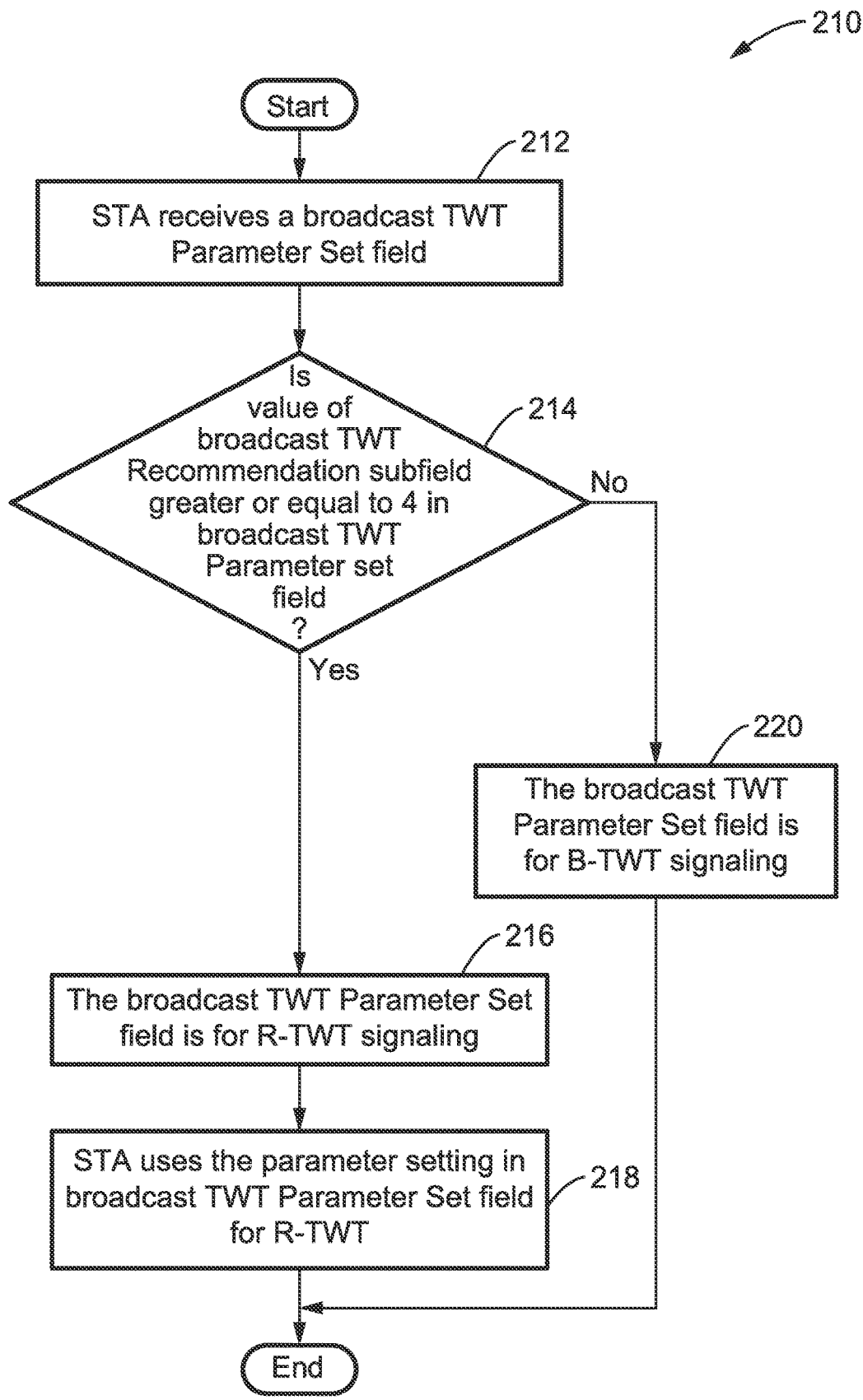
FIG. 8 is a flow diagram of identifying if the received Broadcast TWT Parameter Set field indicates use of a second R-TWT signaling option according to at least one embodiment of the present disclosure.

FIG. 8 illustrates an example embodiment 210 describing a STA identifying whether the received Broadcast TWT Parameter Set field indicates R-TWT signaling when Option 2 from FIG. 6 is used.

This flowchart explains how the STA identifies whether the received broadcast TWT Parameter Set field is for R-TWT signaling when Option 2 from FIG. 6 is used. It will be appreciated that the STA can be a TWT scheduling AP or an individual STA.

In particular, the flow diagram depicts a STA receiving 212 a Broadcast TWT Parameter Set field, with a check 214 being made on the Broadcast TWT Recommendation subfield to determine if its value is equal to or greater than a set value, which is "4" in providing compatibility with existing subfield values. If the value is not equal to or greater than this set value, then it has been determined 220 that B-TWT signaling is to be performed.

Otherwise, if at block 214, the value is a match (equal to or greater than a set value, which is 4 in this instance), then execution reaches block 216 with it being determined that the Broadcast TWT parameter Set field indicates that R-TWT signaling is to be performed. Then in block 218 the STA uses the parameter settings in the Broadcast TWT parameter Set field for R-TWT.

5.2. Option 1 w/Each Reserved Bit Representing an R-TWT Set

Figure 9:
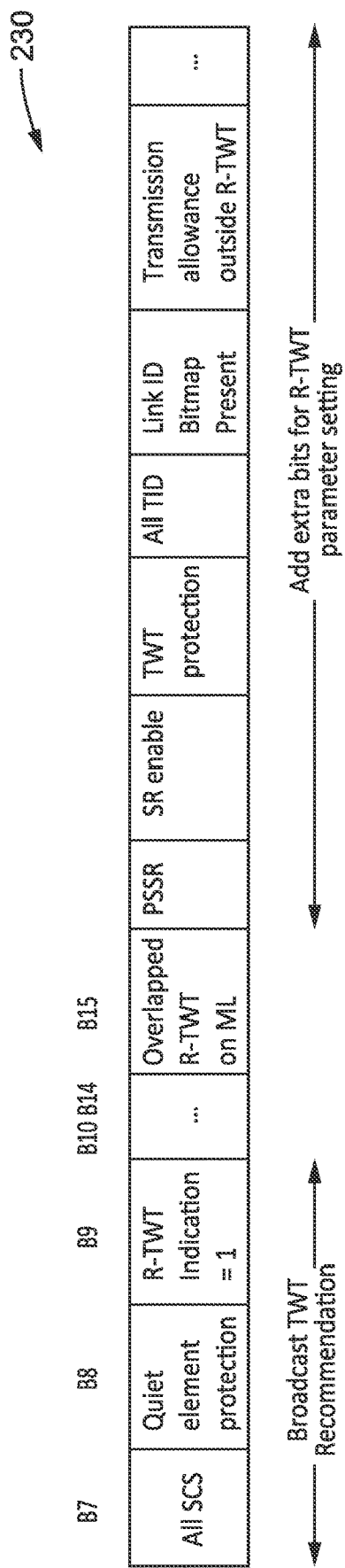
FIG. 9 is a data field diagram of a Request Type subfield in a Broadcast TWT Recommendation field using a first R-TWT signaling option according to at least one embodiment of the present disclosure.

FIG. 9 illustrates an example embodiment 230 of the Request Type field in a Broadcast TWT Recommendation subfield showing an Option 1 example in which each reserved bit represents an R-TWT set.

The request type field in a Broadcast TWT parameter set field only contains B7 to B15. When it is for R-TWT signaling, especially the R-TWT negotiation, the extra bits can be added in the request type field or any places in the Broadcast TWT parameter set field for the R-TWT parameter setting. It should be noted that the position of each bit parameter can be changed.

The R-TWT indication subfield is at bit 9 (B9) of the Request Type field (or the most significant bit) in a broadcast TWT parameter set field. The R-TWT indication provides one bit indication for indicating whether the signaling is for R-TWT or B-TWT. For example, when set to a first state (e.g., "1"), this indicates that the signaling is for R-TWT instead of a B-TWT. Accordingly, the TWT SP in the signaling would be scheduled for R-TWT SP. Otherwise, the value of the broadcast TWT recommendation field is from 0 to 3 which is for broadcast TWT signaling and the TWT SP in the signaling is scheduled for B-TWT SP.

For the other reserved bits in the Broadcast TWT parameter set field, each bit can be used to set the parameter set for R-TWT if the signaling is for R-TWT. It is possible that each option bit can be set by the scheduling AP only, and other STAs have to follow the set by the scheduling AP when they send the broadcast TWT parameter set for the same R-TWT.

Alternatively, in at least one embodiment each option bit can be negotiated between the scheduling AP only and the STA requesting membership of the R-TWT. After negotiation, the scheduling AP broadcasts this option bit setting to other members or this option bit is reserved when the scheduling AP broadcast it.

For example, the Overlapped R-TWT on ML field in FIG. 9 is set when a STA requests membership of the R-TWT, but is otherwise reserved (not used) when the scheduling AP broadcasts the Broadcast TWT parameter set. If this option bit is reserved when the scheduling AP broadcasts it, then this bit option only takes effect between the scheduling AP and the R-TWT member STA (or scheduled STA) which negotiates this option. If this option bit is set when the scheduling AP broadcasts it, then this bit option also takes effect for all the member STAs of the corresponding R-TWT. It should be noted that the description of each option below may represent a default operation of the R-TWT even if it is not a parameter set in broadcast TWT parameter set field. For example, the extend R-TWT SP field may not be a parameter set in broadcast TWT parameter set field because R-TWT SP is always allowed to extend by default.

It should be noted that it is possible that each option below can be any bit(s) in the broadcast TWT parameter set field (including the extra bits added to the broadcast TWT parameter set field for R-TWT parameter setting).

(1) Quiet element protection: this one bit indicates whether a quiet interval will be scheduled to protect the R-TWT SP. This subfield is set to a first state (e.g., "1") to indicate that the scheduling AP will use quiet element to schedule the quiet interval to protect R-TWT SP. The STAs (or member STAs of the R-TWT SP only) which receive this bit can ignore the quiet interval that is scheduled during the R-TWT SP. Otherwise, this subfield is set to a second state (e.g., "0") and there is no quiet interval scheduled to protect R-TWT SP.

(2) All SCS (or All Traffic Stream (TS)): this one bit indicates whether it is allowed for the traffic belonging to all the SCSs (or TSs) to transmit during the R-TWT SP. This field is set to a first state (e.g., "1") if it is allowed, or a second state (e.g., "0") it is not allowed and only the traffic belonging to the specified SCS (or TS) can be transmitted during the R-TWT SP. In at least one embodiment, the SCS (or TS) setup information (such as SCSID, TID, TSPEC element or QoS Characteristic element) can be included in the TWT signaling frames, such as TWT request/response frame.

(3) Extend R-TWT SP: this subfield may constitute a one bit indication. If this bit is set to a first state (e.g., "1"), then the R-TWT SP can be extended by the members (or the scheduling AP only) of the R-TWT; for example, if its R-TWT SP does not start as scheduled, or if the members of the R-TWT could not access the channel at the scheduled start time of R-TWT SP.

Then it can arise that the scheduling AP or the member STA may reserve a TXOP during R-TWT SP that exceeds the original scheduled R-TWT SP end time. It should be noted that in at least one embodiment the extended R-TWT SP time is constrained so that it is not longer than the Transmit Opportunity (TXOP) limit. Also, in at least one embodiment the TXOP time obtained by a R-TWT member (including the scheduling AP) during the R-TWT SP is constrained so that it is not longer than the scheduled R-TWT SP time. In at least one embodiment, the R-TWT can be trigger-based, wherein only the AP can extend the R-TWT SP. Otherwise, this bit is set to a second state (e.g., "0") and the R-TWT SP cannot be extended. R-TWT SP has to end at the scheduled end time, and the TXOP reserved by the R-TWT member (including the scheduling AP) during the R-TWT SP cannot exceed the original scheduled end time of the R-TWT SP. In at least one embodiment if there is another R-TWT SP scheduled immediately after the current R-TWT SP, then the extent of the R-TWT SP subfield for the current R-TWT SP should be set to a second state (e.g., "0"). In at least one embodiment the scheduling AP makes the decision of setting this subfield.

It some instances the R-TWT SP can be extended only for DL transmissions of any member STAs of the R-TWT SP and/or UL/P2P transmissions of the member STAs of the R-TWT SP that do not contend the channel outside the R-TWT SPs.

(4) Target Wake-up required: this subfield can be implemented with a one-bit indication. If this bit is set to a first state (e.g., "1"), then the member of the R-TWT will wake-up and sleep according to the broadcast TWT. For example, the member STA of the R-TWT wakes up during the R-TWT SP and falls asleep outside the R-TWT SP. Otherwise, this bit is set to second state (e.g., "0") and the member STA of the R-TWT always remains awake. Then, the scheduling AP can transmit DL transmissions (and/or trigger UL/P2P transmissions) to the member STA outside the R-TWT SP. It should be noted that the R-TWT SP is scheduled and informed the same as B-TWT SP.

(5) Overlapped R-TWT on ML: this one bit indication can be set to indicate whether the scheduling AP MLD and the same R-TWT MLD members are allowed to start multiple overlapped R-TWT SPs on different links. If this bit is set to a first state (e.g., "1"), then the AP and the R-TWT members are allowed to start multiple R-TWT SPs on different links. In at least one embodiment quiet intervals may not be allowed to be used, thus protecting the R-TWT SP. Otherwise, this bit is set to a second state (e.g., "0") and the AP and the R-TWT members could only start one R-TWT SP on a link even if there are multiple overlapped R-TWT SPs scheduled on the different links.

(6) PSRR: this one bit indication can be used to indicate whether the AP has to send a PSRR PPDU to trigger a UL transmission. If this bit is set to a first state (e.g., "1"), then the AP is configured to send PSRR PPDU to trigger UL transmissions (PSRT PPDU) during the R-TWT SP. That is, the AP cannot set the spatial reuse field in the UpLink (UL) spatial reuse subfield in the common information field of the trigger frame (PSRR PPDU) to PSR_DISALLOW or PSR_AND_NON-SRG_OBSS_PD_PROHIBITED to disallow OBSS STAs from performing Parameterized Spatial Reuse (PSR)-based SR transmission. The value of spatial reuse of the solicited TB PPSU should follows the PSRR PPDU. When the Overlapping Basic Service Set (OBSS) STAs receive this bit, it will recognize that there are Spatial Reuse Parameters (SRP) during R-TWT SPs.

Otherwise, this bit is set to a second state (e.g., "0") and the AP does not send PSRR PPDU when triggering UL transmissions. If the AP broadcasts this option, the OBSS STAs receiving this option can access the channel during a Parameterized Spatial Reuse (PSR) opportunity, and the intra-Basic Service Set (BSS) STA may not request membership of the R-TWT if it does not support PSR-based SR. It is also possible that the intra-BSS STA can request to change this option when it requests membership.

(7) SR enable: this one bit indication can be used to indicate whether spatial reuse is allowed during the R-TWT SP. When this bit is set to a first state (e.g., "1"), then the AP and the members of the R-TWT may (or must) perform spatial reuse operation, such as OBSS Preamble Detect (PD)-based spatial reuse and PSR-based spatial reuse as defined in IEEE 802.11ax, during the R-TWT SP. The spatial reuse operation during the R-TWT SP can be the same as outside the R-TWT SP. Otherwise, this bit is set to a second state (e.g., "0"), and the scheduling AP and the members of the R-TWT are not allowed to perform spatial reuse operation during the R-TWT SP. If AP broadcasts this option, the OBSS STAs receiving this option can access the channel during a Spatial Reuse (SR) opportunity, and the intra-BSS STA may not request the membership of the R-TWT if it does not support SR. The intra-BSS STA can also request to change this option when it requests membership.

(8) TWT protection: this bit is similar to the TWT protection request type field in the Individual TWT parameter set field.

(9) All TID: this one bit indication is set to indicate whether traffic belonging to all the TIDs is allowed to be transmitted during the R-TWT SP. This field is set to a first state (e.g., "1") if the traffic (maybe low latency traffic only) belonging to all the TIDs is allowed to be transmitted during the R-TWT SP, and STAs which are members of the R-TWT can transmit the traffic (maybe low latency traffic only) belonging to all the TIDs to transmit during the R-TWT SP. Otherwise, this subfield is set to a second state (e.g., "0") and only the traffic (maybe low latency traffic only) belonging to the specified TID can be transmitted during the R-TWT SP. The traffic information can be included in the TWT signaling frames, such as TWT request/respond frame.

(10) Link ID Bitmap Present: this one bit indication can be used to indicate whether there is a Link ID Bitmap field in the Broadcast TWT parameter set field. If this bit is set to a first state (e.g., "1"), then the R-TWT signaling is for multi-link R-TWT and the Link ID Bitmap field is present in the Broadcast TWT parameter set field. The R-TWT SPs should be scheduled on the links that are indicated in the Link ID Bitmap field. Otherwise, this bit is set to a second state (e.g., "0") and the Link ID Bitmap field is not present in the Broadcast TWT parameter set field. The R-TWT signaling is only for the link that the signaling is transmitted over.

(11) Transmission allowance outside R-TWT: this field is set to a first state (e.g., "1") to indicate that the member STA of the R-TWT is allowed to contend for channel access (i.e., transmit frames) outside of the R-TWT SP. In a TWT request frame, this bit (set to "1") could also represent that the individual STA which applies for R-TWT membership needs to (or will) transmit (and/or receive) frames outside the SPs of the R-TWT. In a TWT response frame, this bit (set to "1") could also indicate that the R-TWT scheduling AP may/will schedule UL (and/or DL and/or P2P) transmission for the member STA of the R-TWT. Otherwise, this bit is set to a second state (e.g., "0") to indicate that the member STA of the R-TWT is not allowed to (or should not) contend for channel access (maybe also transmit and receive) outside the R-TWT SP. In a TWT request frame, this bit (set to "0") could also represent that the individual STA which applies for the membership of the R-TWT will not transmit (and/or receive) frames outside the SPs of the R-TWT. In a TWT response frame, this bit (set to "0") could also indicate that the R-TWT scheduling AP will not schedule UL (and/or DL and/or P2P) transmission for the member STA of the R-TWT.

It is possible that when the individual STA sets this bit in a TWT request frame to indicate that it needs to (or will) transmit (and/or receive) frames outside the SPs of the R-TWT and the TWT request is accepted, the R-TWT scheduling AP only schedules (or trigger) UL (and/or DL and/or P2P) transmission for the individual STA within the scheduled R-TWT SPs. For example, if the R-TWT SP is extended after the scheduled end time, the R-TWT scheduling AP will not schedule UL (and/or DL and/or P2P) transmission for the individual STA. That is, the R-TWT SP will not be extended for the UL (and/or DL and/or P2P) transmission for the individual STA as a member of the R-TWT SP. It is possible that when the individual STA sets this bit in a TWT request frame to indicate that it will not transmit (and/or receive) frames outside the SPs of the R-TWT and the TWT request is accepted, the R-TWT scheduling AP may extend the R-TWT SP for the UL (and/or DL and/or P2P) transmission for the individual STA as a member of the R-TWT SP.

The figure depicts an example of using B7 for the All SCS subfield, B8 for Quiet element protection subfield, and B15 for the overlapped R-TWT on ML subfield. It will be noted that each reserved bit can be used for any R-TWT parameter set option. For example, ALL SCS subfield in B7 could be replaced by all TID subfield. It will be noted that the request type field in a broadcast TWT parameter set field for R-TWT can be added with extra bits if it is for R-TWT signaling. For example, PSRR field, SR enable field, TWT protection field, All TID field, LinkID Bitmap Present field, Transmission allowance outside R-TWT field are in extra bits for R-TWT parameter setting as shown in the figure. It should also be appreciated that those extra bits can be anyplace in the Broadcast TWT parameter set field for the R-TWT parameter setting.

5.3. Example of Using Reserved Bit in Broadcast TWT Info

Figure 10:
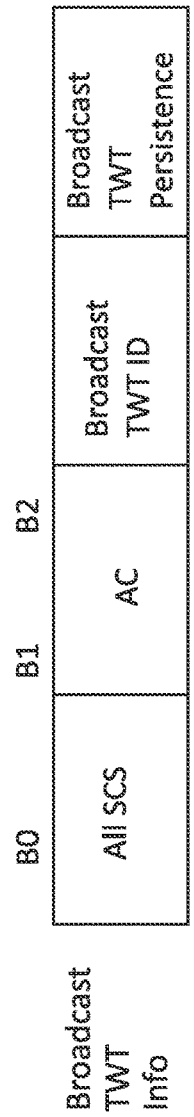
FIG. 10 is a data field diagram of using a reserved bit in the Broadcast TWT Information field R-TWT information according to at least one embodiment of the present disclosure.

FIG. 10 illustrates an example embodiment 250 of using a reserved bit in the Broadcast TWT Info field. When B-TWT signaling is used for R-TWT, the reserved bits B0 through B2 in the Broadcast TWT Information field can be used for R-TWT information, as shown in the example. It should be noted that the reserved bits can be used for any fields as shown in FIG. 9.

(1) All SCS: this one bit indication is set to indicate whether the traffic belonging to all the SCSs is allowed to transmit during R-TWT SP. This field is set to a first state (e.g., "1") to allow the traffic belonging to all the SCSs to transmit during the R-TWT SP, and STAs which are members of the R-TWT can transmit the traffic belonging to all the SCSs to transmit during the R-TWT SP. Otherwise, this subfield is set to a second state (e.g., "0") and only the traffic belonging to the specified SCS can be transmitted during the R-TWT SP. The SCS setup information (e.g., SCS ID field, TSPEC element (or QoS Characteristic element), TCLAS element, Traffic Classification (TCLAS) Processing element, Intra-Access Category Priority Element) can be included in the TWT signaling frames, such as TWT request/respond frame. The SCS setup information can be used to set up an SCS whose traffic is to be transmitted during the R-TWT SP. In this example, if the All SCS field is set to a second state (e.g., "0"), then the traffic from the SCS indicated in the SCS ID field can be transmitted during the R-TWT SP.

(2) AC: when this field is set to an AC, then the traffic whose priority is higher or equal to the AC indicated in the AC field can be transmitted during the R-TWT SP. For example, value 0 for AC_BK, value 1 for AC_BE, value 2 for AC_VI, value 3 for AC_VO. When this field is set to 1, then the traffic of AC_VO, AC_VI, AC_BE can be transmitted during R-TWT SP since AC_VO, AC_VI have higher priority than AC_BE. In some instances, it is possible that only the traffic of the AC indicated in the AC field can be transmitted during the R-TWT SP.

(3) When the Broadcast TWT Information is used for R-TWT, the Broadcast TWT ID represents the R-TWT ID. It will be noted that a scheduling AP or STA should not set a same ID to a R-TWT and a broadcast TWT at the same time. In this way, an AP or STA can differentiate a broadcast TWT from a R-TWT by their IDs.

(4) An AC subfield can be carried by any other two reserved bits in the Broadcast TWT parameter set field.

5.4. Example of Setting all SCS to Zero

Figure 11:
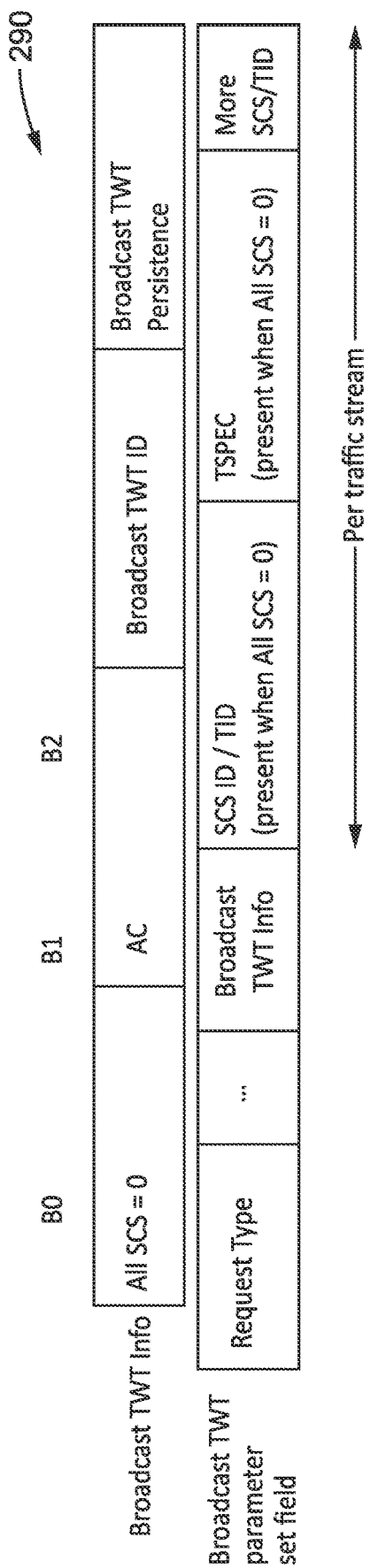
FIG. 11 is a data field diagram of setting All SCS (Stream Classification Service) for not allowed as utilized according to at least one embodiment of the present disclosure.

FIG. 11 illustrates an example embodiment 290 of setting All SCS for not allowed (e.g., "0"). The upper portion of the figure depicts the Broadcast TWT information field, while the lower portion of the figure depicts the Broadcast TWT Parameter Set Field.

(1) When the All SCS field is set to "0" (second state), the traffic information (i.e., per traffic stream), such as SCSID, TSPEC (or QoS Characteristic element) and TID per traffic stream can be included in the broadcast TWT parameter set field in TWT signaling frames, such as TWT setup (request/response) frame. It should be appreciated that the All SCS fields can be replaced by any field which can indicate the presence of traffic information. In at least one embodiment the SCS ID, TID and TSPEC field (or QoS Characteristics element) can be present by default, for example when it is sent by a non-AP STA to request membership of an R-TWT. The traffic information can be included at any place within TWT signaling frames, such as in a TWT setup (request/response) frame.

(2) When the traffic information is present in a broadcast TWT parameter set field of a broadcast TWT setup frame which is sent by a non-AP STA to request a membership of a R-TWT, the traffic information specifies the traffic belonging to the traffic streams (between the non-AP STA and the scheduling AP) indicated in the traffic information needs to be transmitted during the R-TWT SPs. When the scheduling AP receives this information, it can decide whether to accept the membership request or not to accept it, as based on that information. Below are two examples in which the scheduling AP does not accept the membership request due what is found in the traffic information.

(a) In at least one embodiment the membership request is not accepted if the total time that will be required to transmit the traffic of all the traffic streams indicated in the broadcast TWT parameter set field exceeds the amount of time that can be scheduled for the R-TWT SP. For example, the sum of the medium time in the TSPEC elements of all the traffic streams indicated in the broadcast TWT parameter set field is longer than the scheduled R-TWT SPs allowed time per second.

(b) In at least one embodiment, the membership request will not be accepted if the total time is required to transmit the traffic of all the traffic streams indicated in the broadcast TWT parameter set field exceeds the upper limit of the total time of all the R-TWT SPs that a scheduling AP could schedule (or a scheduling AP MLD could schedule on all links). It is possible that there exists an upper limit of the total time of all the R-TWT SPs that each scheduling AP could schedule (or a scheduling AP MLD could schedule on all links) in the network. If the transmission time (e.g., the sum of the medium time in the TSPEC elements of all the traffic streams indicated in the broadcast TWT parameter set field is equal to 60 ms per second) of all the traffic streams indicated in the broadcast TWT parameter set field requires the scheduling AP to schedule R-TWT SP time which results in the total time of all the R-TWT SPs of the scheduling AP (or the scheduling AP MLD) exceeding the upper limit (e.g., upper limit=5 ms per beacon interval (e.g., 0.1 s) or approximately 5 ms/0.1 s=50 ms/s<60 ms/s), then the scheduling AP can reject the membership request.

(3) When the traffic information is present in a broadcast TWT parameter set field of a broadcast TWT setup frame which is sent by a scheduling AP to accept a membership request of a R-TWT, the traffic information can represent the traffic (transmitted between the non-AP STA and the scheduling AP) that is allowed to transmit during the scheduled R-TWT SPs while other traffic (transmitted between the non-AP STA and the scheduling AP) can be either not allowed to transmit or has lower priority (compared with the traffic indicated in the traffic information) to transmit during the R-TWT SPs.

(4) When the traffic information is present in a broadcast TWT parameter set field of a broadcast TWT setup frame which is sent by a scheduling AP to respond to a membership request of a R-TWT and the TWT setup command field in a response frame is Alternate TWT or Dictate TWT, the traffic information could represent the traffic (transmitted between the non-AP STA and the scheduling AP) that is suggested to transmit during the R-TWT SPs. The non-AP STA can send another request frame with the suggested traffic information to request the membership of the R-TWT.

(5) More SCS/TID: this field is set to a first state (e.g., "1") to indicate that there is more traffic information, such as SCSID, TSPEC and TID for another traffic stream. Otherwise, this bit is set to a second state (e.g., "0").

(6) The traffic information can be used to identify traffic, such as in differentiating latency sensitive traffic, under SCS or TSPEC, from other traffic.

(7) It should be noted that a scheduling AP MLD is a MLD having multiple scheduling affiliated with different links. It is possible that one traffic stream, such as SCS, can be mapped to only one R-TWT of a scheduling AP MLD or could be mapped to only one R-TWT of a scheduling AP on one link. For example, one SCS can only be mapped to one R-TWT. That is, when the traffic of the SCS is allowed to transmit by a R-TWT during its R-TWT SP, other R-TWTs should not accept the request to transmit the traffic of that SCS during their R-TWT SPs.

5.5. Example of Setting Link ID Bitmap being Present

Figure 12:
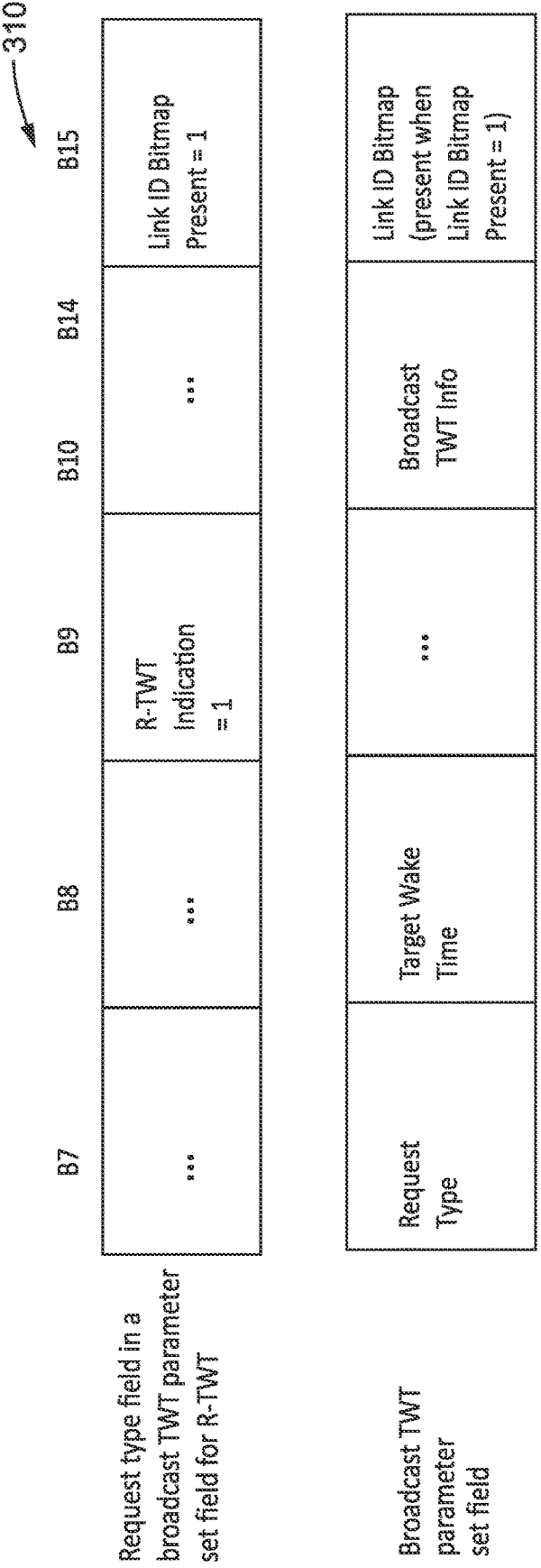
FIG. 12 is a data field diagram of indicating that the Link ID Bitmap is Present as utilized according to at least one embodiment of the present disclosure.

FIG. 12 illustrates an example embodiment 310 of indicating that the Link ID Bitmap is Present. The upper portion of the figure depicts request type field in a Broadcast TWT Parameter Set field for R-TWT, while the lower portion of the figure depicts the Broadcast TWT Parameter Set Field.

When the signaling is used for R-TWT and Link ID Bitmap Present is set to a first state (e.g., "1") in the signaling, then the Link ID Bitmap is present in the Broadcast TWT parameter set field.

As shown in the figure, B15 of Request type field in a broadcast TWT parameter set field for R-TWT is used to carry the Link ID Bitmap Present subfield. Although any reserved bit in the Broadcast TWT parameter set field can operate in the same manner as B15 of Request type field in a broadcast TWT parameter set field.

Link ID Bitmap: this field consists of a sequence of bits, with each bit presets or is mapped to a link. If a bit is set to a first state (e.g., "1"), then the R-TWT is set for the link with respect to that bit. Otherwise, the bit is set to a second state (e.g., "0") and the R-TWT is not for the link with respect to that bit. It will be noted that this is one possible way to schedule overlapped R-TWT SPs on multiple links. It should also be noted that Link ID Bitmap Present subfield could also be used for the broadcast TWT setup on multiple links. It will be noted that more than one bit can be set to "1" in the Link ID Bitmap field.

5.6. Option 2: Each Value Represents an R-TWT Option

In Option 2 the bit values of Bits 4 through 7 of the Broadcast TWT Recommendation field represents one R-TWT with default parameter set.

By way of example and not limitation, each value between 4 and 7 can be set to represent one of the following R-TWT settings:
  Basic R-TWT, or
  R-TWT with quiet element, or protection, or
  R-TWT with quiet element, or protection and only for specified SCS, or
  R-TWT for specified SCS only, or
  Overlapped R-TWT on ML, or
  Overlapped R-TWT on ML for specified SCS only, or
  R-TWT with no target wake-up required, or
  R-TWT with the constraints of the frames transmitted during the R-TWT SP similar to value 0 to 3.

In this example, for instance the value 4 represents Basic R-TWT. It should be appreciated that the values may be mapped in any desired sequence without departing from the teachings of the present disclosure.

5.6. Overlapped R-TWT SPs on Multiple Links

Figure 13:
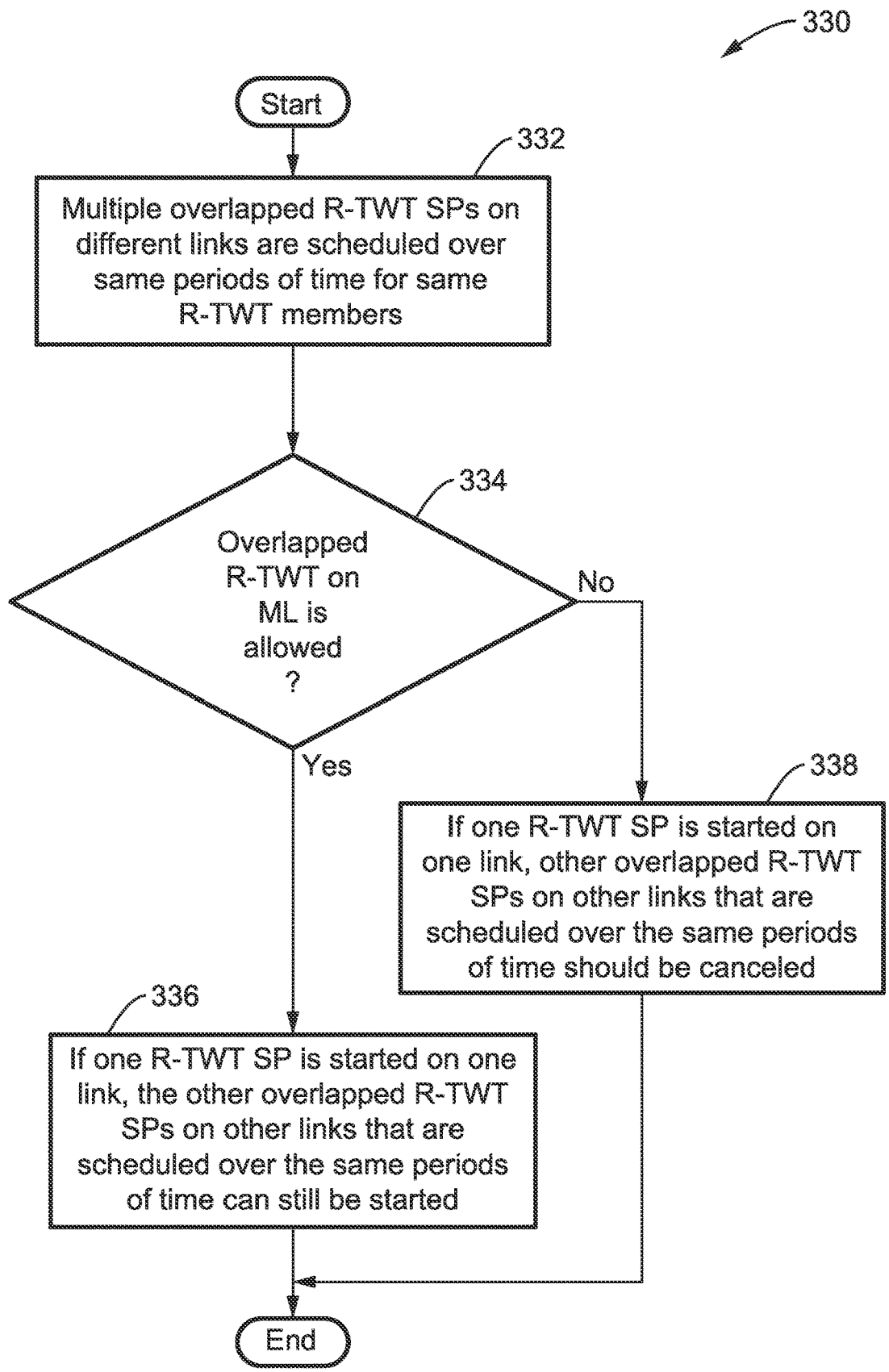
FIG. 13 is a flow diagram of performing overlapped R-TWT SPs on multiple links according to at least one embodiment of the present disclosure.

FIG. 13 illustrates an example embodiment 330 of performing overlapped R-TWT SPs on multiple links. The overlapped R-TWT on different links are the R-TWT managed by a scheduling AP MLD and their R-TWT SPs on the different links are scheduled over the same periods of time. It will be noted that the overlapped R-TWT may only represent those serving the same TIDs or the same SCSs or the traffic streams or the same MLD members.

In particular, the operation depicts multiple overlapped R-TWT SPs on different links being scheduled 332 over the same periods of time for the same R-TWT members.

A check 334 determines if overlapped R-TWT on multiple links is allowed. By way of example, this can involve checking to see if the ML subfield is set to a first state (e.g., "1") indicating that overlapped R-TWT on ML is allowed, while if overlapped R-TWT on ML subfield is set to a second state (e.g., "0"), then overlapped R-TWT on ML is not allowed.

If overlapped R-TWT on multiple links is not allowed, then at block 338 if the process determines that one R-TWT SP is started on one link, then other overlapped R-TWT SPs on other links being scheduled over the same periods of time are to be canceled.

Otherwise, if overlapped R-TWT on multiple links are allowed, then at block 336 if the process determines that one R-TWT SP is started on one link, then other overlapped R-TWT SPs on other links being scheduled over the same periods of time can still be started.

5.7. Examples of Overlapped R-TWT on ML

Figure 14:
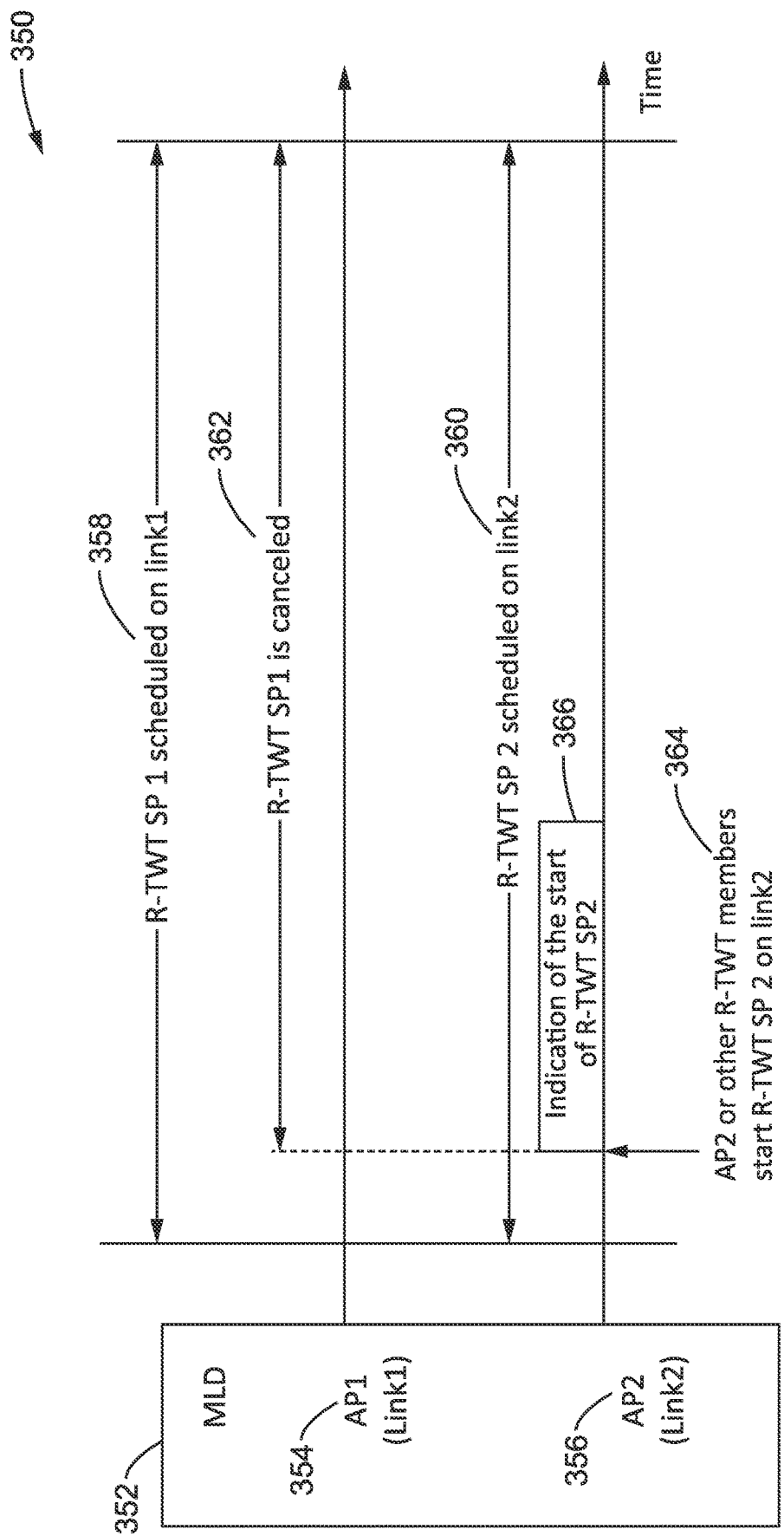
FIG. 14 is a communication diagram of a first example of overlapped R-TWT on multiple links (ML) utilized according to at least one embodiment of the present disclosure.

FIG. 14 illustrates an example embodiment 350 of a first example of Overlapped R-TWT on ML (Overlapped R-TWT on ML=0).

The figure depicts an MLD 352 with AP1 354 and AP2 356.

There are multiple overlapped R-TWT SPs, such as for R-TWT SP1 358 and SP2 360, scheduled on different links, e.g., link1 and link2. The Overlapped R-TWT on ML field is set to 0 for the overlapped R-TWT SPs. MLD members start 364 a R-TWT SP2 366 on link2.

All the MLDs operating on link1 and link2 can ascertain that R-TWT SP2 is started on link2, for instance by sensing a frame indicating the start of R-TWT SP2, and thus will recognize that the R-TWT SP1 on link1 is canceled 362 since the Overlapped R-TWT on ML field=0. Then, all the MLDs (or only the MLDs that are not R-TWT members) are able to contend for the channel on link1 during the R-TWT SP1. If there is a quiet interval scheduled during the R-TWT SP on link1, the STAs operating on link1 can ignore the quiet interval.

AP2 or the R-TWT SP2 member can send a frame to indicate the start of R-TWT SP2. This frame for example may be a Clear-to-Send (CTS) frame with special Recipient Address (RA) field which indicates the start of R-TWT SP2. The RA field of the frame (e.g., CTS) can be set to a special ID to a link that can be mapped to the R-TWT ID and/or the STA ID and/or BSS ID. In at least one embodiment or mode, the RA field of the frame can be set to the address of AP2. Other stations (nodes) can determine the start of R-TWT SP2 scheduled by AP2.

Figure 15:
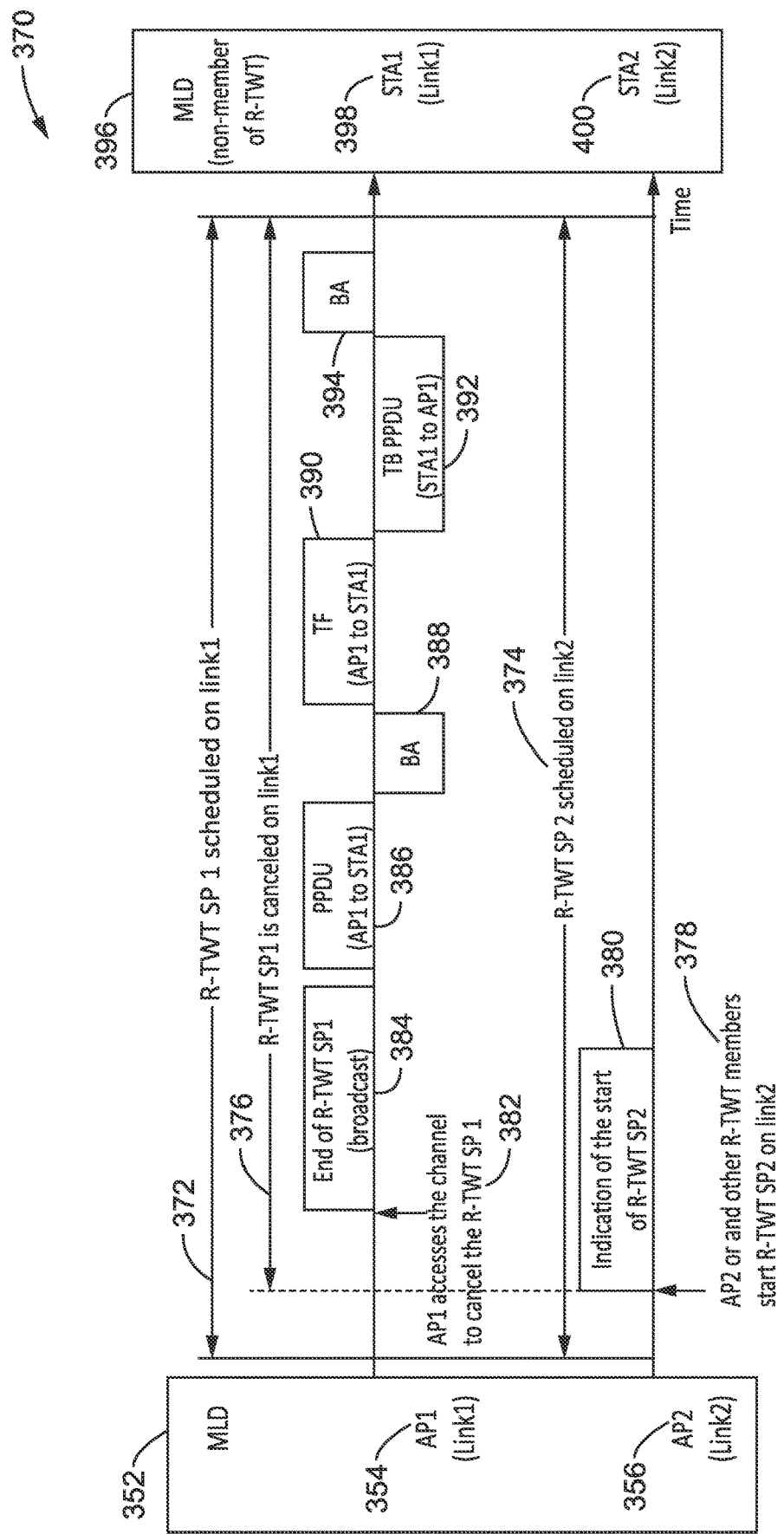
FIG. 15 is a communication diagram of a second example of overlapped R-TWT on ML utilized according to at least one embodiment of the present disclosure.

FIG. 15 illustrates an example embodiment 370 of a second example of overlapped R-TWT on ML (Overlapped R-TWT on ML=0). The figure depicts communications between an MLD 352 with its AP1 354 and AP2 356, and another MLD 396, which is not a member of the R-TWT, having associated stations STA1 398 and STA2 400.

There are multiple overlapped R-TWT SPs, exemplified here as R-TWT SP1 372 and SP2 374, scheduled on different links, depicted as link1 and link2. The Overlapped R-TWT on ML field is set to 0 for the overlapped R-TWT SPs. MLD members start 378 a R-TWT SP2 380 on link2.

All the MLDs operating on link1 and link2 ascertain that R-TWT SP2 is started on link2, such as by sensing a frame indicating the start of R-TWT SP2, and thus they recognize that the R-TWT SP1 on link1 is canceled 376 since the Overlapped R-TWT on ML field=0.

Then, all the MLDs (or only the MLDs that are not R-TWT members) are able to contend for the channel on link1 during the R-TWT SP1. If there is a quiet interval scheduled during the R-TWT SP on link1, those MLDs operating on link1 can ignore the quiet interval.

AP2 or the R-TWT SP2 member can send a frame to indicate the start of R-TWT SP2. This frame could be a CTS frame with special RA which indicates the start of R-TWT SP2. The RA field of the frame (e.g., CTS) could be set to a special ID to link that can be mapped to the R-TWT ID and/or the STA ID and/or BSS ID. It is also possible that the RA field of the frame is set to the address of AP2. Other nodes can recognize the start of R-TWT SP2 scheduled by AP2.

The AP affiliated with the same MLD of the R-TWT SP2 members on link1 (e.g., AP1) may access 382 the channel on link1 for communicating 384 until the R-TWT SP on link2 ends for the following purposes only. The scheduling AP may access the channel to send a frame, such as a QoS Data or QoS Null frame that had the EOSP subfield equal to 1, to indicate the end of R-TWT SP1 since it is canceled. The AP may access the channel to serve the R-TWT members whose MLDs are not R-TWT members on link2. The AP may access the channel to send a frame (e.g., CF-End) to indicate the end of the R-TWT SP or the end of the quiet time on link1 which is as depicted 384 in the figure. The TA field of the frame (e.g., CF-End) can be set to a special ID to a link that can be mapped to the R-TWT ID and/or the STA ID and/or BSS ID.

The AP may access the channel to send DL traffic (or DL traffic that is not allowed to be transmitted during the R-TWT SP only) or trigger UL traffic (or UL traffic that is not allowed to be transmitted during the R-TWT SP only) to its associated STAs. The AP may access the channel to send control frames or management frames. By way of example the figure shows a PPDU 386 sent from AP1 to STA1 over link1, followed by a Block Acknowledgement (BA) 388 from STA. A Trigger Frame (TF) 390 is shown being sent from AP1 to STA1 in response to which is a Trigger Based (TB) PPDU 392 from STA1 to AP1, and followed by a BA 394 from AP1.

In at least one embodiment, the R-TWT members may classify an event by indicating the end/termination of a R-TWT SP in the same manner as for B-TWT in IEEE 802.11ax.

Figure 16:
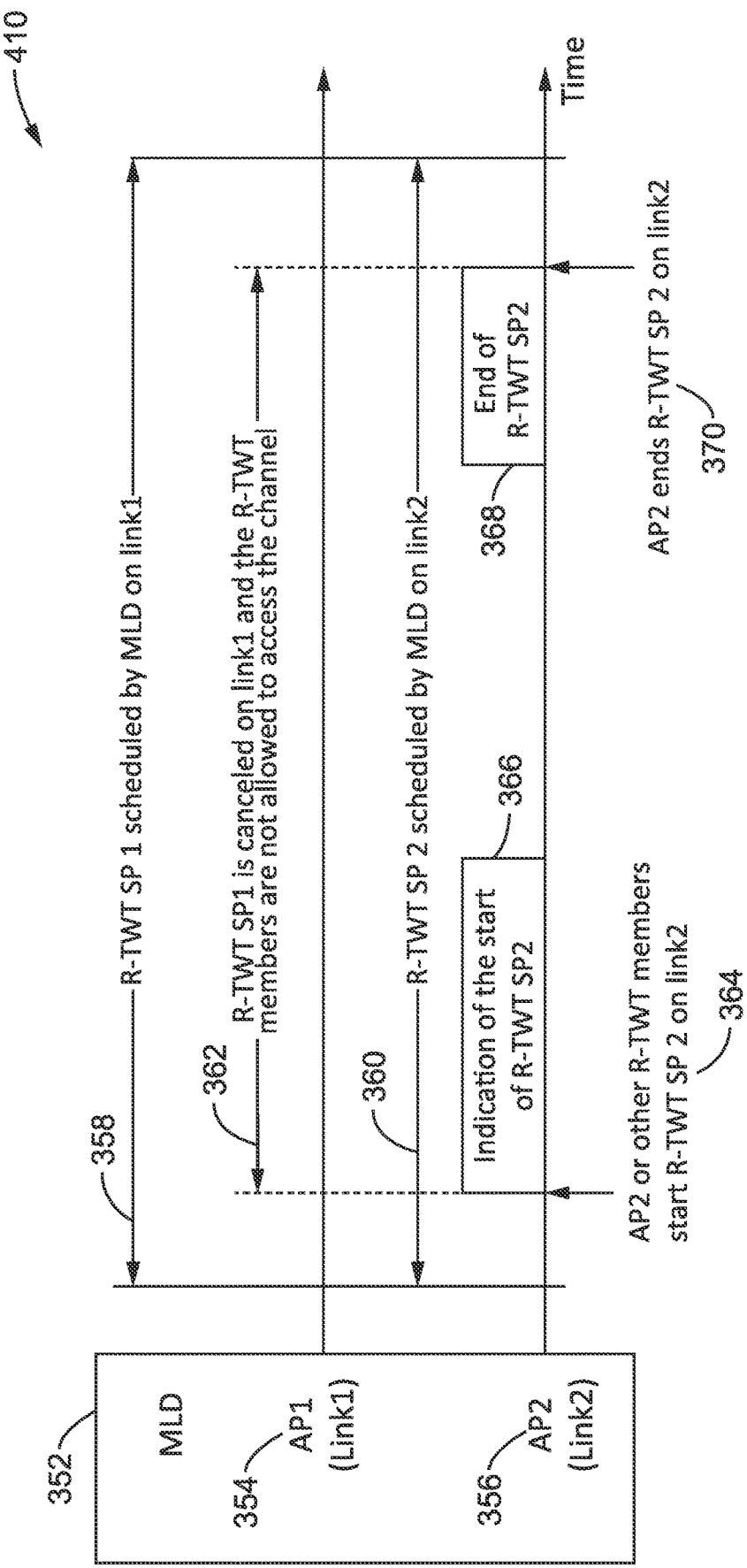
FIG. 16 is a communication diagram of a third example of overlapped R-TWT on ML utilized according to at least one embodiment of the present disclosure.

FIG. 16 illustrates an example embodiment 410 of a third example of overlapped R-TWT on ML (Overlapped R-TWT on ML=0). The figure depicts an MLD 352 with AP1 354 and AP2 356.

There are multiple overlapped R-TWT SPs, depicted for example as R-TWT SP1 358 and SP2 360, scheduled for the same MLD members on different links, depicted as link1 and link2. The Overlapped R-TWT on ML field is set to 0 for the overlapped R-TWT SPs. MLD members start 364 a R-TWT SP2 366 on link2.

All the MLDs operating on link1 and link2 can ascertain that R-TWT SP2 is started on link2, such as by receiving a frame indicating the start of R-TWT SP2, and then will recognize that R-TWT SP1 on link1 is canceled 362 since the Overlapped R-TWT on ML field=0. Then, all the MLDs (or only the MLDs that are not R-TWT members) are able to contend for the channel on link1 during R-TWT SP1. If there is a quiet interval scheduled during the R-TWT SP on link1, those MLDs operating on link1 can ignore the quiet interval.

It is possible that STAs affiliated with the same MLD of the R-TWT members on link1 are not allowed to access the channel on link1 until the R-TWT SP2 on link2 ends. R-TWT SP2 368 on link2 may end 370 earlier than it is scheduled. It is possible that AP2 or the other R-TWT SP2 members send a frame, for example a Contention Free (CF)-End as in the previous example, to indicate the end of R-TWT SP2. It is also possible that the frame (e.g., CF-End) indicates the end of the quiet interval on link2.

The AP affiliated with the same MLD of the R-TWT SP2 members on link1 (e.g., AP1) may access the channel on link1 until the R-TWT SP on link1 (or link2) ends for the following purposes only. The AP may access the channel to serve the R-TWT members whose MLDs are not R-TWT members on link2. The AP may access the channel to send a frame (e.g., CF-End) to indicate the end of the R-TWT SP or the end of the quiet time on link1. The TA field of the frame (e.g., CF-End) can be set to a special ID to a link that can be mapped to the R-TWT ID and/or the STA ID and/or BSS ID. The AP may access the channel to send DownLink (DL) traffic (or DL traffic that is not allowed to be transmitted during the R-TWT SP only) or trigger UL traffic (or UL traffic that are not allowed to be transmitted during the R-TWT SP only) to its associated STAs. The AP may access the channel to send control frames or management frames.

Figure 17:
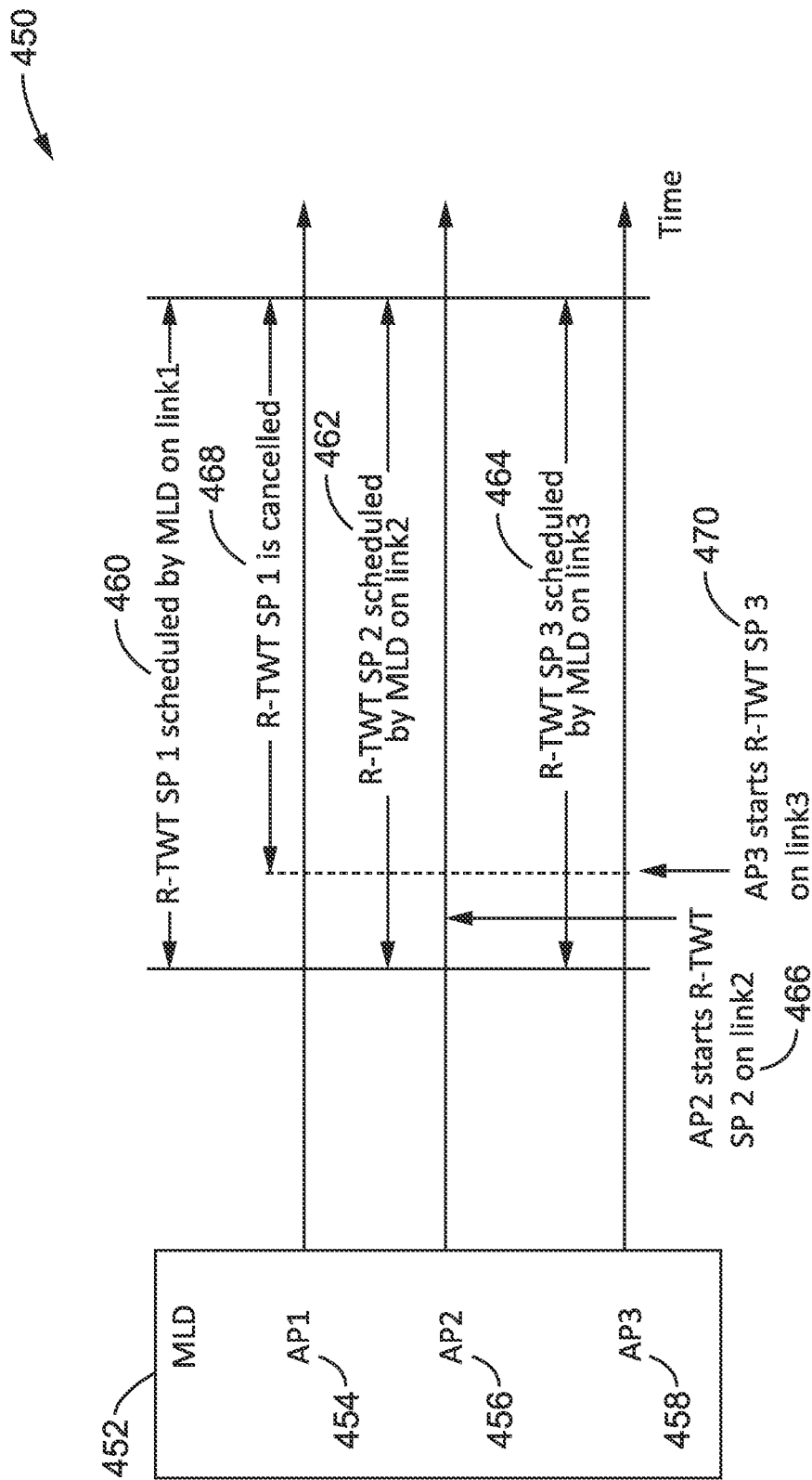
FIG. 17 is a communication diagram of a fourth example of overlapped R-TWT on ML utilized according to at least one embodiment of the present disclosure.

FIG. 17 illustrates an example embodiment 450 of a fourth example of overlapped R-TWT on ML. In this example there is allowed a maximum of two overlapped R-TWT SPs on different links over the same periods of time. The figure depicts an MLD 452 with AP1 454, AP2 456 and AP3 458.

The figure shows an overlapped R-TWT with ML=1, and there is an R-TWT SP1, 460, SP2 462 and SP3 464, scheduled. In this example, only a limited number overlapped R-TWT SPs are allowed to be started on different links. In the example, only a maximum of two overlapped R-TWT SPs can be started (or launched) during the same period of R-TWT SP time on different links. This example may only work with trigger subfield=1 in Request type field in a broadcast TWT parameter set field.

It is seen that AP2 starts 466 an R-TWT SP2 on link2, then upon AP3 starting 470 R-TWT SP3 on link3, then R-TWT SP1 is cancelled 468.

Figure 18:
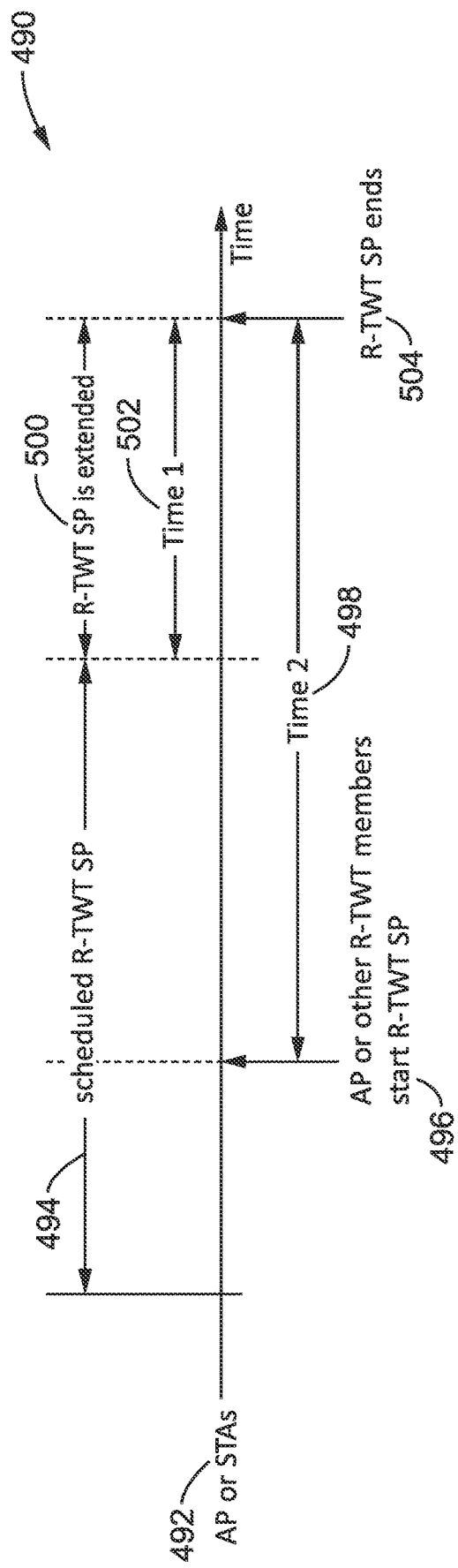
FIG. 18 is a communication diagram of an example of extending R-TWT SP according to at least one embodiment of the present disclosure.

FIG. 18 illustrates an example embodiment 490 of extending R-TWT SP. The figure depicts an example of extending R-TWT SP, such as when the subfield Extend R-TWT SP is set to a first state (e.g., "1"), indicating that R-TWT SP is extended. In the figure, AP or STAs are seen with scheduled R-TWT SP 494, which can be extended 500, by a time period Time 1 502. The AP or other R-TWT members may start 496 an R-TWT SP (e.g., the time of gaining channel access and obtaining TXOP) for a time period Time 2 498 until R-TWT SP ends 504. The present disclosure can provide numerous options for R-TWT SP extensions.

The following options to limit R-TWT SP extension are provided by way of example and not limitation.

Option1: Time 1 should not be longer than the TXOP limit.

Option2: Time 1 should not be longer than a given fraction (e.g., 50%) of the TXOP limit duration.

Option3: Time 2 should not be longer than the TXOP limit.

Option4: Time 2 should not be longer than a given fraction (e.g., 50%) of the TXOP limit.

Option5: Time 2 should not be longer than the scheduled R-TWT SP time.

Option6: Time 1 should not exceed the next target beacon transmission time.

Option7: the AP or STA that is a member of the R-TWT SP can extend the R-TWT SP when it obtains a TXOP during the scheduled R-TWT SP and the TXOP lasts beyond the end time of the scheduled R-TWT SP. The R-TWT SP is extended to the end time of the TXOP.

Option8: AP or STA that is a member of the R-TWT SP can extend the R-TWT SP when it starts a PPDU transmission during the scheduled R-TWT SP and the PPDU duration and the solicited transmissions are beyond the end time of the scheduled R-TWT SP. The R-TWT SP is extended to the end time of that PPDU transmission and its solicited transmissions.

The TXOP limit could be the TXOP limit of the AC which obtains the TXOP. The TXOP limit can also be the TXOP limit of the AC of the highest priority TID whose traffic is scheduled to transmit during R-TWT SP. The TXOP limit can also be the maximum TXOP limit of the TIDs whose traffic is scheduled to transmit during R-TWT. The TXOP limit could be a value set for the R-TWT SP only.

Figure 19:
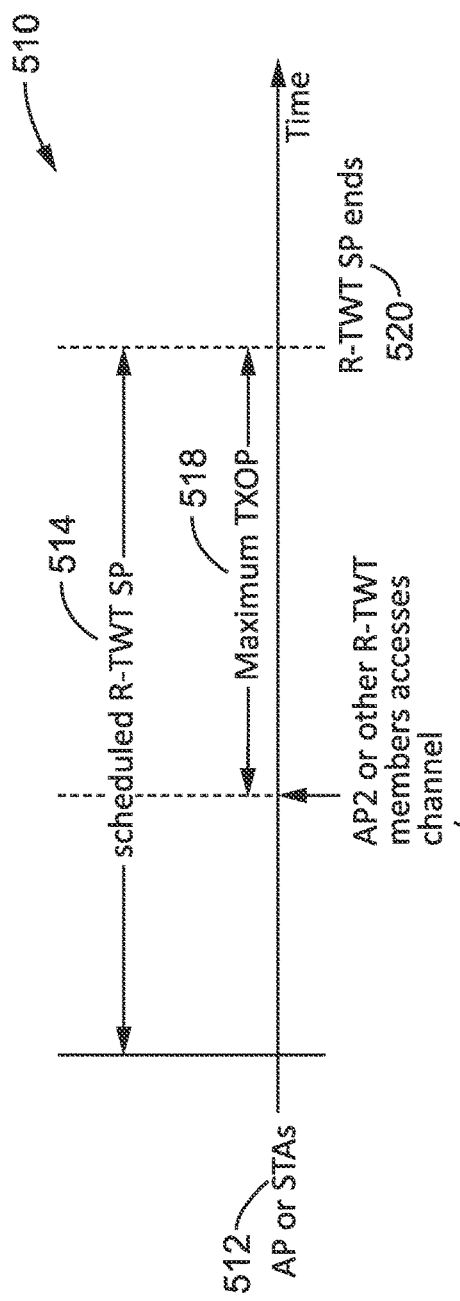
FIG. 19 is a communication diagram of an example in which R-TWT extension is not allowed according to at least one embodiment of the present disclosure.

FIG. 19 illustrates an example embodiment 510 of when R-TWT extension is not allowed. This example shows a situation in which extending R-TWT SP is not allowed, for example when the subfield Extend R-TWT SP is set to a second state (e.g., "0") indicative of not allowing extension.

AP or STAs 512 are seen with scheduled R-TWT SP 514. AP2 or other R-TWT members access the channel 516 up to the maximum TXOP length 518.

As shown in the figure, R-TWT SP cannot be extended. When a R-TWT member accesses the channel during R-TWT SP, it can't reserve TXOP exceeding the end time 520 of R-TWT SP.

Figure 20:
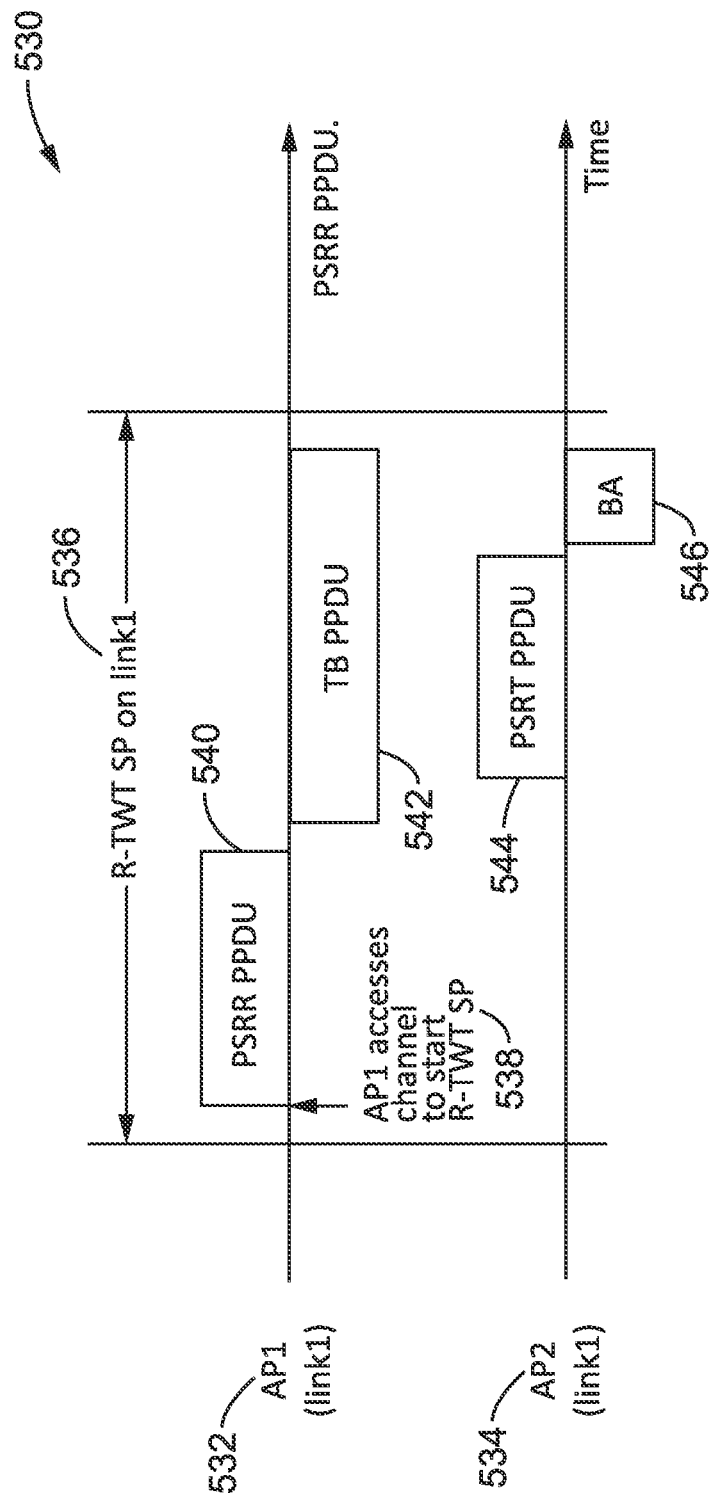
FIG. 20 is a communication diagram of setting Parameterized Spatial Reuse Reception (PSRR) to allow Parameterized Spatial Reuse (PSR), according to at least one embodiment of the present disclosure.

FIG. 20 illustrates an example embodiment 530 of setting PSRR to allow PSR, such as setting PSRR to a first state (e.g., "1"). AP1 should always set parameters in PSRR PPDU to allow PSR.

AP1 532 and AP2 534 are shown with R-TWT SP on link1 536, with AP1 accessing the channel to start 538 R-TWT SPT with a PSRR PPDU 540. The figure also exemplifies a TB PPDU 542 being received, during which AP2 sends a PSRT PPDU 544 for which a block acknowledgement 546 is shown.

In this example, AP1 could not set the spatial reuse field in the UL spatial reuse subfield of the common info field of the trigger frame (PSRR PPDU) to PSR_DISALLOW or PSR_AND_NON-SRG_OBSS_PD PROHIBITED to disallow OBSS STAs from performing PSR-based SR transmission. The value of spatial reuse of the solicited TB PPSU should follow the PSRR PPDU.

5.8. Using Quiet Element to Schedule Quiet Time

In at least one implementations or mode, a quiet element is utilized to schedule quiet time within the R-TWT SP to protect the R-TWT SP. The quiet interval should not exceed the R-TWT SP time. The end of this quiet time and the end time of the R-TWT SP should be aligned (and/or the start time of quiet time and the start time of the R-TWT SP should be aligned).

If a R-TWT SP member accesses the channel during the R-TWT SP for R-TWT purposes, it can send a frame (e.g., CF-End) to cancel the quiet time scheduled during the quiet time.

If a R-TWT SP ends earlier than it was scheduled, it can send a frame (e.g., CF-End) to cancel the quiet time scheduled during the current R-TWT SP.

Figure 21:
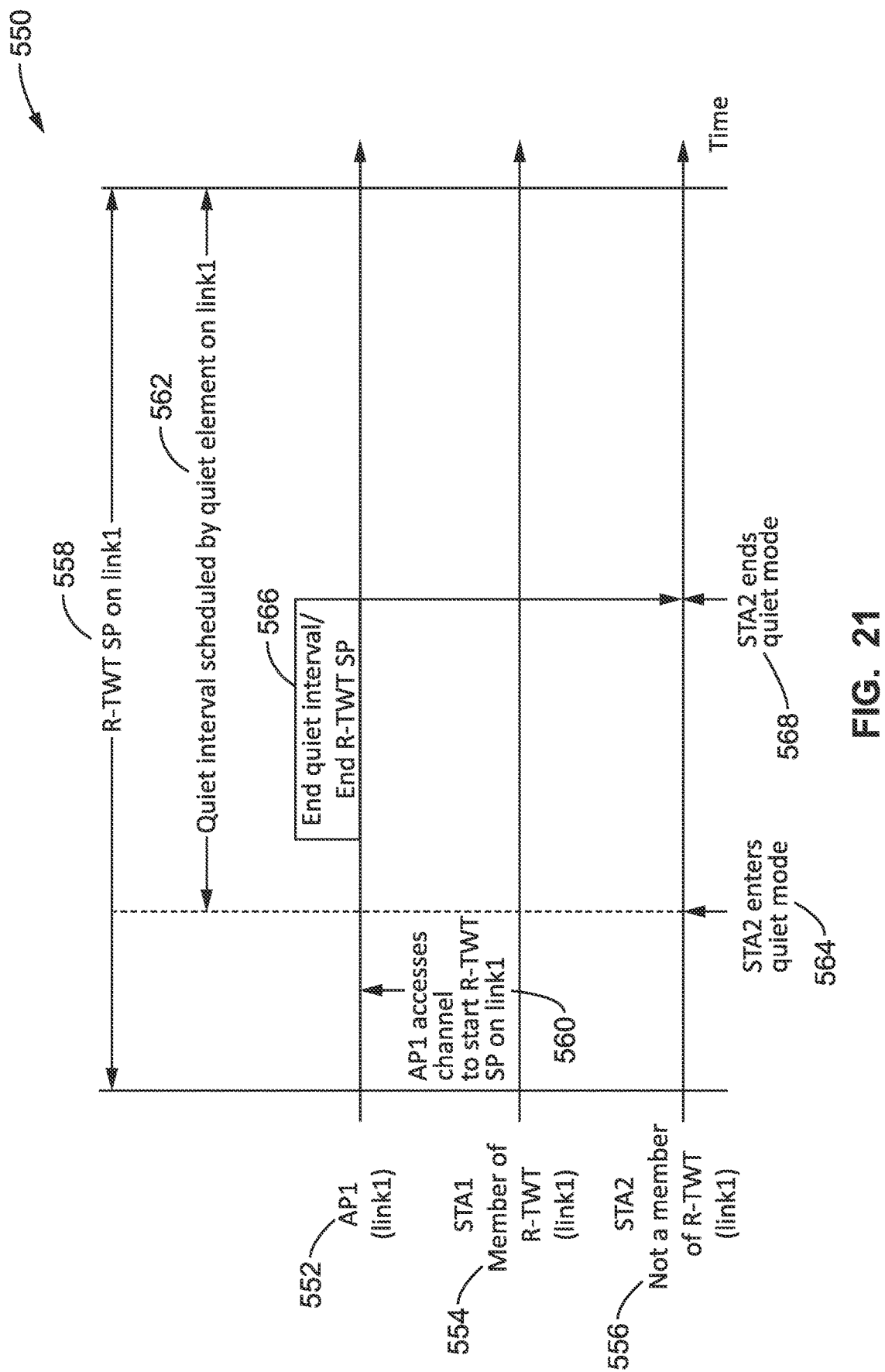
FIG. 21 is a communication diagram of a first example of using quiet element according to at least one embodiment of the present disclosure.

FIG. 21 illustrates an example embodiment 550 of a first example of using a quiet element, in which the end time of the quiet interval and the end time of the R-TWT SP are aligned.

The figure shows AP1 552 on link1, STA1 554 as a member of R-TWT on link1, and STA2 556, which is not a member of R-TWT on link1.

An R-TWT SP on link1 558 is shown during which AP1 560 accesses the channel to start R-TWT SP on link1. A scheduled quiet interval 562 is commenced on link1, with STA2 entering 564 the quiet mode. The quiet time interval ends coinciding with the end of R-TWT SP 566 on link1, upon which STA2 ends 568 its quiet mode.

Figure 22:
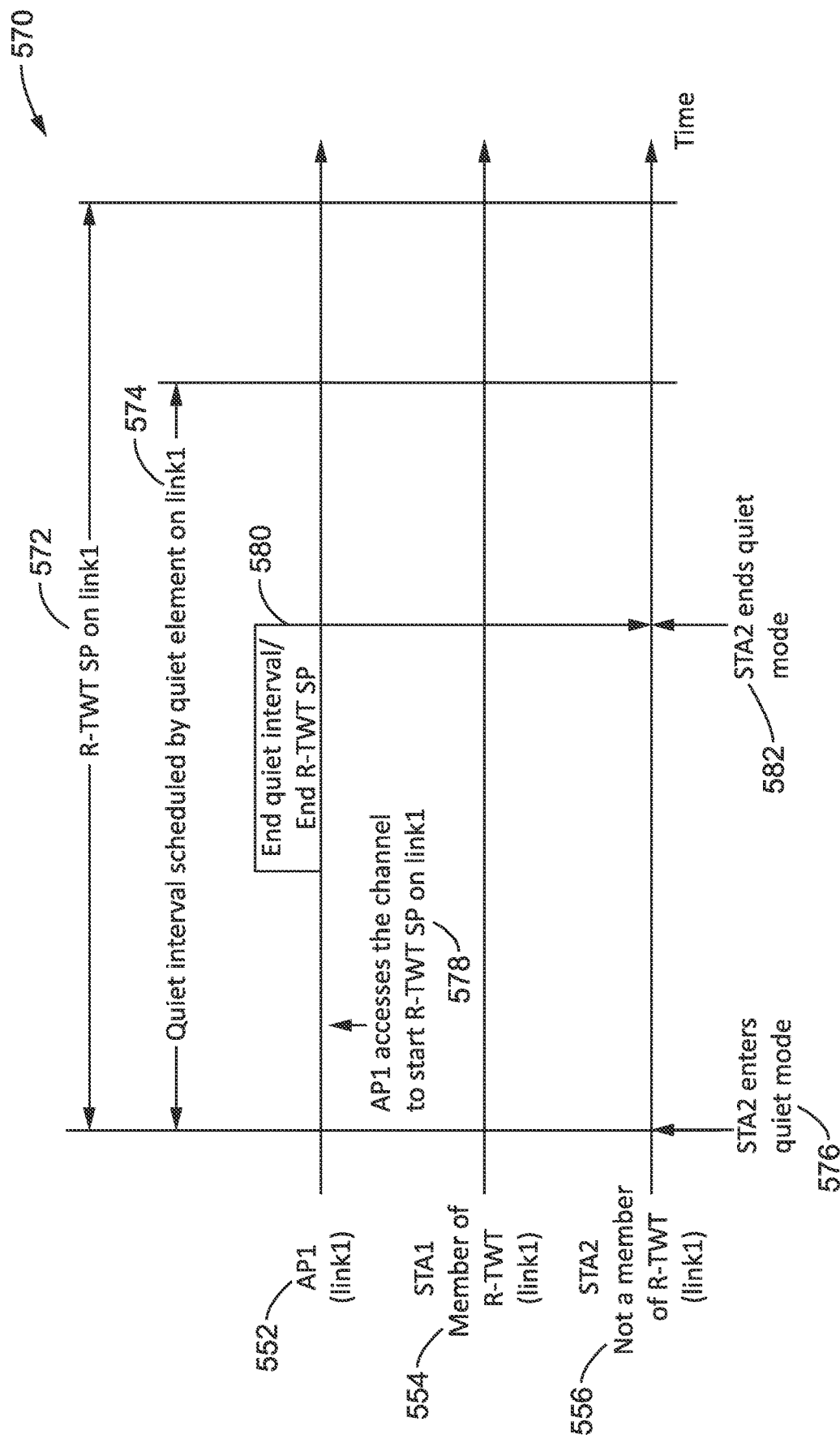
FIG. 22 is a communication diagram of a second example of using quiet element according to at least one embodiment of the present disclosure.

FIG. 22 illustrates an example embodiment 570 of a second example of using a quiet element. The figure shows the same stations as in the prior example.

An R-TWT SP on link1 572 is shown arising at the time a quiet interval 574 is scheduled on link1 by the quiet element. In response to this STA2 enters 576 quiet mode.

AP1 accesses 578 the channel to start R-TWT SP on link1. The quiet time interval ends coinciding with the end of an R-TWT SP 580 on link1, upon which STA2 ends 582 its quiet mode.

6. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating as either a regular STA or an Access Point (AP) STA for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) reusing broadcast target wake time (B-TWT) signaling as defined in IEEE 802.11ax for establishing a restricted TWT (R-TWT); (d)(ii) indicating within said B-TWT, using a bit of a broadcast TWT parameter set field which is reserved in IEEE 802.11ax, for indicating use of R-TWT; and (d)(iii) indicating additional settings to specify traffic flow for R-TWT in response to utilizing other bits in the broadcast TWT recommendation field which are reserved in IEEE 802.11ax.

An apparatus for wireless communication in a network, the apparatus comprising: (a) a wireless communication circuit, as a wireless station (STA) operating as either a regular STA or an Access Point (AP) STA for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) reusing broadcast target wake time (B-TWT) signaling as defined in IEEE 802.11ax for establishing a restricted TWT (R-TWT);

(d)(ii) indicating within said B-TWT, using a bit of a broadcast TWT parameter set field which is reserved in IEEE 802.11ax, for indicating use of R-TWT; (d)(iii) indicating additional settings to specify traffic flow for R-TWT in response to utilizing other bits in the broadcast TWT recommendation field which are reserved in IEEE 802.11ax; and (d)(iv) wherein one or more of said traffic flow settings are selected from the group of traffic flow settings consisting of: (A) indicating whether a quiet element is used to protect R-TWT, (B) indicating whether the restricted TWT can be extended to beyond its scheduled end time if corresponding traffic has not been transmitted at the end of R-TWT SP, (C) indicating whether the AP is forced to use PSR-based spatial reuse during restricted TWT SP, (D) indicating whether the AP and R-TWT members can access multiple overlapped R-TWT SPs on different links over the same periods of time, (E) indicating whether traffic from all the SCS is allowed to transmit during R-TWT SP, (F) indicating whether the member of R-TWT need to wake-up and sleep in response to the broadcast TWT, (G) indicating an amount of traffic information included in the Broadcast TWT parameter set field.

A method of wireless communication in a network, comprising: (a) communicating between a wireless station (STA) executing a wireless communications protocol and operating as either a regular STA or an Access Point (AP) STA for wirelessly communicating with other wireless stations (STAs) using a carrier sense multiple access/collision avoidance (CSMA/CA) mechanism on a wireless local area network (WLAN); (b) reusing broadcast target wake time (B-TWT) signaling as defined in IEEE 802.11ax for establishing a restricted TWT (R-TWT); (c) indicating within said B-TWT, using a bit of a broadcast TWT parameter set field which is reserved in IEEE 802.11ax, for indicating use of R-TWT; and (d) indicating additional settings to specify traffic flow for R-TWT in response to utilizing other bits in the broadcast TWT recommendation field which are reserved in IEEE 802.11ax.

An apparatus for wireless communication in a network, the apparatus comprising: (a) a wireless communication circuit, as a wireless station (STA) operating as either a regular STA or an Access Point (AP) STA for wirelessly communicating packets with other wireless stations (STAs) using a carrier sense multiple access/collision avoidance (CSMA/CA) mechanism for use with a multi-link device (MLD) on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) scheduling multiple overlapped R-TWT SPs by the MLD; (d)(ii) starting a R-TWT SP on a link if the number of overlapped R-TWT SPs that have been started on other links have not reached a maximum number; and (d)(iii) canceling R-TWT SPs on certain links if a number of R-TWT SPs has been started on other links has reached a maximum number.

An apparatus for wireless communication in a network, the apparatus comprising: (a) a wireless communication circuit, as a wireless station (STA) operating as either a regular STA or an Access Point (AP) STA for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) setting up a R-TWT and scheduling quiet intervals whereby the R-TWT SP end time aligns to end times of the quiet intervals; (d)(ii) entering a quiet mode during the quiet interval by STAs that are not members of the R-TWT; and (d)(iii) wherein STAs that are members of the R-TWT are not allowed to enter quiet mode during the quiet interval.

An apparatus for wireless communication in a network, the apparatus comprising: (a) a wireless communication circuit, as a wireless station (STA) operating as either a regular STA or an Access Point (AP) STA for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) sending a R-TWT membership request to an associated AP with specific traffic information that will be transmitted during R-TWT SPs; (d)(ii) wherein acceptance of said R-TWT membership request is determined by the associated AP based on the specific traffic information; and (d)(iii) wherein the associated AP uses the specific traffic information to differentiate traffic matching this specific traffic information from traffic information of others.

An apparatus for wireless communication in a network, the apparatus comprising: (a) a wireless communication circuit, as a wireless station (STA) operating as an Access Point (AP) STA for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform one or more steps of a wireless communications protocol for said wireless communication circuit, comprising: (d)(i) scheduling a start time of a R-TWT SP by the AP; (d)(ii) starting the R-TWT SP, by the AP and R-TWT members, as scheduled; and (d)(iii) extending the R-TWT SP be an extended time, by the AP and R-TWT members, if they are unable to start the R-TWT SP as scheduled.

A wireless communication apparatus performing transmission of packets, where CSMA/CA is applied in the system/apparatus, comprising: (a) STA reuses the broadcast TWT signaling as defined in IEEE 802.11ax to set up restricted TWT; (b) STA indicates that the signaling is for restricted TWT in broadcast TWT recommendation field in a reserved bit of broadcast TWT parameter set field; and (c) STA indicates the additional setting of restricted TWT in broadcast TWT recommendation field.

A wireless communication apparatus for performing transmission of packets, where CSMA/CA is applied in the system/apparatus, comprising: (a) MLD schedules multiple overlapped R-TWT SPs; (b) an R-TWT SP on a link can be started if the number of overlapped R-TWT SPs that has been started on other links does not reach the maximum number (the overlapped R-TWT may only represent those serving the same TIDs or the same SCSs or the traffic streams); (c) the R-TWT SPs on some links are canceled if the maximum number of R-TWT SPs has been started on other links.

A Wireless communication apparatus performing transmission of packets, where CSMA/CA is applied in the system/apparatus, comprising: (a) a STA sets up a R-TWT and schedules quiet intervals whereby the R-TWT SP end time algins to quiet interval end time; (b) the STAs that are not the members of the R-TWT enter quiet mode during the quiet interval; (c) the STAs that are the members of the R-TWT may not enter quiet mode during the quiet interval.

A wireless communication apparatus performing transmission of packets, where CSMA/CA is applied in the system/apparatus, comprising: (a) a STA sends a R-TWT membership request to the AP with specific traffic information that will be transmitted during R-TWT SPs; (b) the AP decides whether to accept the R-TWT membership request based on the specific traffic information; (c) the AP uses the specific traffic information to differentiate traffic matching the specific traffic information from others.

A wireless communication apparatus performing transmission of packets, where CSMA/CA is applied in the system/apparatus, comprising: (a) AP schedules a start time of a R-TWT SP; (b) AP and the R-TWT members try to start the R-TWT SP as scheduled; (c) AP and the R-TWT members extend the R-TWT SP if they are unable to start the R-TWT SP as scheduled.

The apparatus or method of any preceding implementation.

The apparatus or method of any preceding implementation, wherein the STA uses bit 9 (B9) of the request type field in the broadcast TWT parameter set field to indicate whether the broadcast TWT signaling is for restricted TWT (R-TWT).

The apparatus or method of any preceding implementation, wherein the STA uses one bit between bit 7 (B7) and bit 8 (B8) or bit 15 (B15) of the request type field in the broadcast TWT parameter set field to indicate additional settings for restricted TWT.

The apparatus or method of any preceding implementation, wherein the STA uses one bit between bit 7 (B7) and bit 8 (B8) or bit 15 (B15) of the request type field in the broadcast TWT parameter set field to indicate whether a quiet element is used to protect R-TWT; and wherein said quiet element is utilized to schedule quiet intervals to prevent channel contention from the STAs, which are not members of the R-TWT SP, enter a quiet mode during the R-TWT SP after receiving a quiet element command from the scheduling AP.

The apparatus or method of any preceding implementation, wherein the STA uses one bit between bit 7 (B7) and bit 8 (B8) or bit 15 (B15) of the request type field in the broadcast TWT parameter set field to indicate whether the restricted TWT can be extended to beyond its scheduled end time if corresponding traffic has not been transmitted at the end of R-TWT SP.

The apparatus or method of any preceding implementation, wherein the STA use one bit between bit 7 (B7) and bit 8 (B8) or bit 15 (B15) of the request type field in the broadcast TWT parameter set field to indicate whether the AP is forced to use PSR-based spatial reuse during restricted TWT SP.

The apparatus or method of any preceding implementation, wherein said PSR-based spatial reuse comprises Parameterized Spatial Reuse Transmission (PSRT) or Parameterized Spatial Reuse Reception (PSRR) Physical Layer Convergence Procedure (PLCP) Protocol Data Unit (PPDU) as defined IEEE 802.11ax for spatial reuse.

The apparatus or method of any preceding implementation, wherein the STA uses one bit between bit 7 (B7) and bit 8 (B8) or bit 15 (B15) of the request type field in the broadcast TWT parameter set field to indicate whether the AP and R-TWT members can access multiple overlapped R-TWT SPs on different links over the same periods of time.

The apparatus or method of any preceding implementation, wherein an option for multiple overlapped R-TWT SPs is selected from the group of options consisting of (a) allowing only one scheduled overlapped R-TWT SP to be started and the others cancelled; and (b) allowing multiple scheduled overlapped R-TWT SPs to be started.

The apparatus or method of any preceding implementation, wherein the STA uses one bit between bit 7 (B7) and bit 8 (B8) or bit 15 (B15) of the request type field in the broadcast TWT parameter set field to indicate whether the traffic from all the SCS is allowed to transmit during R-TWT SP.

The apparatus or method of any preceding implementation, wherein the STA uses one bit between bit 7 (B7) and bit 8 (B8) or bit 15 (B15) of the request type field in the broadcast TWT parameter set field to indicate whether the member of R-TWT need to wake-up and sleep as the broadcast TWT.

The apparatus or method of any preceding implementation, wherein the STA uses one bit between bit 7 (B7) and bit 8 (B8) or bit 15 (B15) of the request type field in the broadcast TWT parameter set field to indicate the amount of traffic information included in the Broadcast TWT parameter set field.

The apparatus or method of any preceding implementation, wherein said traffic information is selected from the group of traffic information consisting of traffic specification (TSPEC), stream classification service identification (SCSID) and traffic identifier (TID).

The apparatus or method of any preceding implementation, wherein the STA uses one bit between bit 7 (B7) and bit 8 (B8) or bit 15 (B15) of the request type field in the broadcast TWT parameter set field to indicate whether the R-TWT member is allowed to perform channel contention outside of the R-TWT SPs.

The apparatus or method of any preceding implementation, wherein the STA uses bit 9 (B9) of the request type field in the broadcast TWT parameter set field to indicate whether the broadcast TWT signaling is for restricted TWT (R-TWT).

The apparatus or method of any preceding implementation, wherein the overlapped R-TWT may only represent those serving the same TIDs or the same SCSs or the traffic streams.

The apparatus or method of any preceding implementation, wherein the R-TWT SP can be ended earlier than its scheduling.

The apparatus or method of any preceding implementation, wherein the STA can send a frame to indicate starting of a R-TWT SP.

The apparatus or method of any preceding implementation, wherein STAs which are the members of the R-TWT SPs that are canceled are not allowed to access the channel until R-TWT SPs on other links end.

The apparatus or method of any preceding implementation, wherein

STAs on the links where R-TWT SPs are canceled follow EDCA or CSMA/CA to contend for the channel.

The apparatus or method of any preceding implementation, wherein the number of overlapped R-TWT SPs that can be started on different links is limited.

The apparatus or method of any preceding implementation, wherein the R-TWT members send a frame to indicate the end the R-TWT SPs.

The apparatus or method of any preceding implementation, wherein STAs receiving a frame to indicate an end of R-TWT SPs can start to contend for the channel.

The apparatus or method of any preceding implementation, further comprising sending a frame to indicate the end of current R-TWT SP, or the end of the quiet interval.

The apparatus or method of any preceding implementation, wherein a quiet interval cannot be scheduled that exceeds R-TWT SP duration.

The apparatus or method of any preceding implementation, further comprising sending a quiet element to inform other STAs of quiet interval scheduling.

The apparatus or method of any preceding implementation, wherein the specific information is selected from the group of information consisting of SCSID, TID and TSPEC.

The apparatus or method of any preceding implementation, further comprising rejecting the R-TWT membership request if the associated AP decides that the R-TWT SP is unable to satisfy transmission requirement of the specific traffic.

The apparatus or method of any preceding implementation, further comprising rejecting the R-TWT membership request if the total time that is required to transmit the specific traffic exceeds the upper limit of the total time of all the R-TWT SPs that the associated AP is allowed to schedule.

The apparatus or method of any preceding implementation, further comprising rejecting the R-TWT membership request if the total time required to transmit the specific traffic exceeds an upper limit of the total time of all the R-TWT SPs that an MLD which the AP is affiliated with is allowed to schedule on all links.

The apparatus or method of any preceding implementation, wherein specific traffic which is identical is not accepted by two different R-TWTs of an AP on one link.

The apparatus or method of any preceding implementation, wherein same specific traffic cannot be accepted by two different R-TWTs of an AP MLD on all links.

The apparatus or method of any preceding implementation, wherein the extended time of the R-TWT SP cannot exceed TXOP limit, or a determined fraction of TXOP limit.

The apparatus or method of any preceding implementation, wherein actual R-TWT SP duration cannot exceed TXOP limit, or a determined fraction of TXOP limit.

The apparatus or method of any preceding implementation, wherein actual R-TWT SP duration cannot exceed scheduled R-TWT SP time.

The apparatus or method of any preceding implementation, wherein extended time of the R-TWT SP cannot exceed next target beacon transmission time.

The apparatus or method of any preceding implementation, wherein the AP or a STA that is a member of the R-TWT SP can extend the R-TWT SP when it obtains a TXOP during the scheduled R-TWT SP when the TXOP extends beyond an end time of the scheduled R-TWT SP; and wherein the R-TWT SP is extended to an end time of the TXOP.

The apparatus or method of any preceding implementation, wherein the AP or a STA that is a member of the R-TWT SP can extend the R-TWT SP when it starts a PPDU transmission during scheduled R-TWT SP and the PPDU duration and the solicited transmissions are beyond an end time of the scheduled R-TWT SP.

The apparatus or method of any preceding implementation, wherein R-TWT SP is extended to an end time of that PPDU transmission and its solicited transmissions.

The apparatus or method of any preceding implementation, where the STA can use B9 of the request type field in broadcast TWT parameter set field to indicate whether the broadcast TWT signaling is for restricted TWT.

The apparatus or method of any preceding implementation, where the STA can use one bit between B7 and B8 or B15 of the request type field in the broadcast TWT parameter set field to indicate additional setting for restricted TWT.

The apparatus or method of any preceding implementation, where the STA can use one bit between B7 and B8 or B15 of the request type field in the broadcast TWT parameter set field to indicate whether the quiet element is used for restricted TWT.

The apparatus or method of any preceding implementation, where the STA can use one bit between B7 and B8 or B15 of the request type field in the broadcast TWT parameter set field to indicate whether the restricted TWT can be extended if there are corresponding traffic has not been transmitted at the end of R-TWT SP.

The apparatus or method of any preceding implementation, where the STA can use one bit between B7 and B8 or B15 of the request type field in the broadcast TWT parameter set field to indicate whether the AP is forced to use PSR-based spatial reuse during restricted TWT SP.

The apparatus or method of any preceding implementation, where the STA can use one bit between B7 and B8 or B15 of the request type field in the broadcast TWT parameter set field to indicate whether the AP and R-TWT members can access multiple R-TWT SPs on different links over the same periods of time.

The apparatus or method of any preceding implementation, where the STA can use one bit between B7 and B8 or B15 of the request type field in the broadcast TWT parameter set field to indicate whether the traffic from all the SCS is allowed to transmit during R-TWT SP.

The apparatus or method of any preceding implementation, where the STA can use one bit between B7 and B8 or B15 of the request type field in the broadcast TWT parameter set field to indicate whether the member of R-TWT need to wake-up and sleep as the broadcast TWT.

The apparatus or method of any preceding implementation, where the STA can use one bit between B7 and B8 or B15 of the request type field in the broadcast TWT parameter set field to indicate whether there are one or more traffic information such as TSPEC, SCSID or TID will be included in Broadcast TWT parameter set field.

The apparatus or method of any preceding implementation, where the STA can use one bit between B7 and B8 or B15 of the request type field in the broadcast TWT parameter set field to indicate whether the R-TWT member is allowed to contend channel outside the R-TWT SPs.

The apparatus or method of any preceding implementation, where the R-TWT SP can be ended earlier than its scheduling.

The apparatus or method of any preceding implementation, where the STA can send a frame to indicate the start of R-TWT SP.

The apparatus or method of any preceding implementation, where the STAs which are the members of the R-TWT SPs that are canceled are not allowed to access the channel until the R-TWT SPs on other links end.

The apparatus or method of any preceding implementation, where all the STAs on the links where R-TWT SPs are canceled follow EDCA or CSMA/CA to contend for the channel.

The apparatus or method of any preceding implementation, where the number of overlapped R-TWT SPs that can be started on different links is limited.

The apparatus or method of any preceding implementation, where the R-TWT members can send a frame to indicate the end the R-TWT SPs.

The apparatus or method of any preceding implementation, where the STAs receiving a frame to indicate the end the R-TWT SPs can start to contend for the channel.

The apparatus or method of any preceding implementation, where the STA can send a frame, such as CF-End, to indicate the end of current R-TWT SP or the end of the quiet interval.

The apparatus or method of any preceding implementation, where the STA cannot schedule a quiet interval that exceeds a R-TWT SP.

The apparatus or method of any preceding implementation, where the STA can send a quiet element to inform the other STAs of the quiet interval scheduling.

The apparatus or method of any preceding implementation, where the specific information comprises SCS ID.

The apparatus or method of any preceding implementation, where the specific information comprises TID.

The apparatus or method of any preceding implementation, where the specific information comprises TSPEC.

The apparatus or method of any preceding implementation, where the AP can reject the R-TWT membership request if the R-TWT SP is unable to satisfy the transmission requirement of the specific traffic.

The apparatus or method of any preceding implementation, where the AP can reject the R-TWT membership request if the total time that is required to transmit the specific traffic exceeds the upper limit of the total time of all the R-TWT SPs that AP is allowed to schedule (or a scheduling AP MLD could schedule on all links).

The apparatus or method of any preceding implementation, where the AP can reject the R-TWT membership request if the total time that is required to transmit the specific traffic exceeds the upper limit of the total time of all the R-TWT SPs that the MLD which AP is affiliated with is allowed to schedule on all links.

The apparatus or method of any preceding implementation, where the same specific traffic cannot be accepted by two different R-TWTs of an AP on one link.

The apparatus or method of any preceding implementation, where the same specific traffic cannot be accepted by two different R-TWTs of an AP MLD on all links.

The apparatus or method of any preceding implementation, where the extended time of the R-TWT SP cannot be longer than the TXOP limit.

The apparatus or method of any preceding implementation, where the extended time of the R-TWT SP cannot be longer than a given fraction (e.g., 50%) of the TXOP limit.

The apparatus or method of any preceding implementation, where the actual R-TWT SP duration cannot be longer than the TXOP limit.

The apparatus or method of any preceding implementation, where the actual R-TWT SP duration cannot be longer than a fraction of TXOP limit.

The apparatus or method of any preceding implementation, where the actual R-TWT SP duration cannot be longer than the scheduled R-TWT SP time.

The apparatus or method of any preceding implementation, where the extended time of the R-TWT SP cannot exceed the next target beacon transmission time.

The apparatus or method of any preceding implementation, where the AP or STA who is the member of the R-TWT SP can extend the R-TWT SP when it obtains a TXOP during the scheduled R-TWT SP and the TXOP lasts beyond the end time of the scheduled R-TWT SP. The R-TWT SP is extended to the end time of the TXOP.

The apparatus or method of any preceding implementation, where the AP or STA who is the member of the R-TWT SP could extend the R-TWT SP when it starts a PPDU transmission during the scheduled R-TWT SP and the PPDU duration and the solicited transmissions are beyond the end time of the scheduled R-TWT SP. The R-TWT SP is extended to the end time of that PPDU transmission and its solicited transmissions.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a wireless station (STA) operating as either a regular STA or an Access Point (AP) STA, for wirelessly communicating with other wireless stations (STAs) using a carrier sense multiple access/collision avoidance (CSMA/CA) mechanism on a wireless local area network (WLAN);
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) reusing broadcast target wake time (B-TWT) signaling as defined in IEEE 802.11ax for establishing a restricted TWT (R-TWT);
      (ii) indicating within said B-TWT, using a bit of a broadcast TWT parameter set field which is reserved in IEEE 802.11ax, for indicating use of R-TWT; and
      (iii) indicating additional settings to specify traffic flow for R-TWT in response to utilizing other bits in a broadcast TWT recommendation field which are reserved in IEEE 802.11ax.

2. The apparatus of claim 1, wherein the STA uses bit 9 (B9) of a request type field in the broadcast TWT parameter set field to indicate whether the broadcast TWT signaling is for restricted TWT (R-TWT).

3. The apparatus of claim 1, wherein the STA uses one bit between bit 7 (B7) and bit 8 (B8) or bit 15 (B15) of a request type field in the broadcast TWT parameter set field to indicate additional settings for restricted TWT.

4. The apparatus of claim 1:
   wherein the STA uses one bit between bit 7 (B7) and bit 8 (B8) or bit 15 (B15) of a request type field in the broadcast TWT parameter set field to indicate whether a quiet element is used to protect R-TWT; and
   wherein said quiet element is utilized to schedule quiet intervals to prevent channel contention from the STAs, which are not members of the R-TWT service period (SP), enter a quiet mode during the R-TWT SP after receiving a quiet element command from a scheduling AP.

5. The apparatus of claim 1, wherein the STA uses one bit between bit 7 (B7) and bit 8 (B8) or bit 15 (B15) of a request type field in the broadcast TWT parameter set field to indicate whether the restricted TWT can be extended to beyond its scheduled end time if corresponding traffic has not been transmitted at the end of R-TWT service period (SP).

6. The apparatus of claim 1, wherein the STA use one bit between bit 7 (B7) and bit 8 (B8) or bit 15 (B15) of a request type field in the broadcast TWT parameter set field to indicate whether the AP is forced to use PSR-based spatial reuse during restricted TWT service period (SP).

7. The apparatus of claim 6, wherein said PSR-based spatial reuse comprises parameterized spatial reuse transmission (PSRT) or parameterized spatial reuse reception (PSRR) physical layer convergence procedure (PLCP) protocol data unit (PPDU) as defined in IEEE 802.11ax for spatial reuse.

8. The apparatus of claim 1, wherein the STA uses one bit between bit 7 (B7) and bit 8 (B8) or bit 15 (B15) of a request type field in the broadcast TWT parameter set field to indicate whether the AP and R-TWT members can access multiple overlapped R-TWT service period (SPs) on different links over the same periods of time.

9. The apparatus of claim 8, wherein an option for multiple overlapped R-TWT SPs is selected from a group of options consisting of (a) allowing only one scheduled overlapped R-TWT SP to be started and the others cancelled; and (b) allowing multiple scheduled overlapped R-TWT service period (SPs) to be started.

10. The apparatus of claim 1, wherein the STA uses one bit between bit 7 (B7) and bit 8 (B8) or bit 15 (B15) of a request type field in the broadcast TWT parameter set field to indicate whether traffic from all stream classification service (SCS) is allowed to transmit during R-TWT service period (SP).

11. The apparatus of claim 1, wherein the STA uses one bit between bit 7 (B7) and bit 8 (B8) or bit 15 (B15) of a request type field in the broadcast TWT parameter set field to indicate whether a member of R-TWT needs to wake-up and sleep as indicated in the broadcast TWT.

12. The apparatus of claim 1, wherein the STA uses one bit between bit 7 (B7) and bit 8 (B8) or bit 15 (B15) of a request type field in the broadcast TWT parameter set field to indicate the amount of traffic information included in the broadcast TWT parameter set field.

13. The apparatus of claim 12, wherein said traffic information is selected from a group of traffic information consisting of traffic specification (TSPEC), stream classification service identification (SCSID) and traffic identifier (TID).

14. The apparatus of claim 1, wherein the STA uses one bit between bit 7 (B7) and bit 8 (B8) or bit 15 (B15) of a request type field in the broadcast TWT parameter set field to indicate whether a R-TWT member is allowed to perform channel contention outside of the R-TWT service period (SPs).

15. An apparatus for wireless communication in a network, the apparatus comprising:
(a) a wireless communication circuit, as a wireless station (STA) operating as either a regular STA or an Access Point (AP) STA for wirelessly communicating with other wireless stations (STAs) using a carrier sense multiple access/collision avoidance (CSMA/CA) mechanism on a wireless local area network (WLAN);
(b) a processor coupled to said wireless communication circuit for operating on the WLAN;
(c) a non-transitory memory storing instructions executable by the processor for communicating with other STAs; and
(d) wherein said instructions, when executed by the processor, perform steps of a wireless communications protocol for said wireless communication circuit, comprising:
(i) reusing broadcast target wake time (B-TWT) signaling as defined in IEEE 802.11ax for establishing a restricted TWT (R-TWT);
(ii) indicating within said B-TWT, using a bit of a broadcast TWT parameter set field which is reserved in IEEE 802.11ax, for indicating use of R-TWT;
(iii) indicating additional settings to specify traffic flow for R-TWT in response to utilizing other bits in a broadcast TWT recommendation field which are reserved in IEEE 802.11ax; and
(iv) wherein one or more traffic flow settings are selected from a group of traffic flow settings consisting of: (A) indicating whether a quiet element is used to protect R-TWT, (B) indicating whether the restricted TWT can be extended to beyond its scheduled end time if corresponding traffic has not been transmitted at the end of R-TWT service period (SP), (C) indicating whether the AP is forced to use PSR-based spatial reuse during restricted TWT SP, (D) indicating whether the AP and R-TWT members can access multiple overlapped R-TWT SPs on different links over the same periods of time, (E) indicating whether traffic from all stream classification service (SCS) is allowed to transmit during R-TWT SP, (F) indicating whether a member of R-TWT needs to wake-up/sleep in response to the broadcast TWT, (G) indicating an amount of traffic information included in the Broadcast TWT parameter set field.

16. The apparatus of claim 15, wherein the STA uses bit 9 (B9) of a request type field in the broadcast TWT parameter set field to indicate whether the broadcast TWT signaling is for restricted TWT (R-TWT).

17. The apparatus of claim 16, wherein the STA uses one bit between bit 7 (B7) and bit 8 (B8) or bit 15 (B15) of the request type field in the broadcast TWT parameter set field to indicate additional settings for restricted TWT.

18. The apparatus of claim 15, wherein said traffic information is selected from a group of traffic information consisting of traffic specification (TSPEC), stream classification service identification (SCSID) and traffic identifier (TID).

19. A method of wireless communication in a network, comprising:
(a) communicating between a wireless station (STA) executing a wireless communications protocol and operating as either a regular STA or an Access Point (AP) STA for wirelessly communicating with other wireless stations (STAs) using a carrier sense multiple access/collision avoidance (CSMA/CA) mechanism on a wireless local area network (WLAN);
(b) reusing broadcast target wake time (B-TWT) signaling as defined in IEEE 802.11ax for establishing a restricted TWT (R-TWT);

(c) indicating within said B-TWT, using a bit of a broadcast TWT parameter set field which is reserved in IEEE 802.11ax, for indicating use of R-TWT; and
(d) indicating additional settings to specify traffic flow for R-TWT in response to utilizing other bits in a broadcast TWT recommendation field which are reserved in IEEE 802.11ax.

20. The method of claim 19, wherein the STA uses bit 9 (B9) of a request type field in the broadcast TWT parameter set field to indicate whether the broadcast TWT signaling is for restricted TWT (R-TWT).

\* \* \* \* \*